United States Patent
Ren et al.

(10) Patent No.: US 12,327,413 B2
(45) Date of Patent: Jun. 10, 2025

(54) IMAGE STITCHING WITH COLOR HARMONIZATION FOR SURROUND VIEW SYSTEMS AND APPLICATIONS

(71) Applicant: NVIDIA Corporation, Santa Clara, CA (US)

(72) Inventors: Yuzhuo Ren, Sunnyvale, CA (US); Dawid Stanislaw Pajak, San Carlos, CA (US); Niranjan Avadhanam, Saratoga, CA (US); Guangli Dai, Houston, TX (US)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 17/959,934

(22) Filed: Oct. 4, 2022

(65) Prior Publication Data
US 2024/0112472 A1    Apr. 4, 2024

(51) Int. Cl.
*G06V 20/56*    (2022.01)
*G06T 7/90*    (2017.01)
(Continued)

(52) U.S. Cl.
CPC ............... *G06V 20/56* (2022.01); *G06T 7/90* (2017.01); *G06T 15/205* (2013.01); *G06V 10/16* (2022.01);
(Continued)

(58) Field of Classification Search
CPC .. C12N 9/12; C12Q 1/6883; C12Q 2600/112; C12Q 2600/156
See application file for complete search history.

(56) References Cited

U.S. PATENT DOCUMENTS 10,166,921 B2    1/2019 Sypitkowski
10,885,698 B2    1/2021 Muthler et al.
(Continued)

FOREIGN PATENT DOCUMENTS

WO    WO-2013074604 A2 *    5/2013    ............... B60R 1/00

OTHER PUBLICATIONS

"Exposure compensation", Wikipedia, Retrieved from Internet URL: https://en.wikipedia.org/wiki/Exposure_compensation, accessed on Jun. 13, 2022, 1-3 pages.
(Continued)

*Primary Examiner* — Md N Haque
(74) *Attorney, Agent, or Firm* — Freestone Intellectual Property Law PLLC

(57) ABSTRACT

In various examples, color statistic(s) from ground projections are used to harmonize color between reference and target frames representing an environment. The reference and target frames may be projected onto a representation of the ground (e.g., a ground plane) of the environment, an overlapping region between the projections may be identified, and the portion of each projection that lands in the overlapping region may be taken as a corresponding ground projection. Color statistics (e.g., mean, variance, standard deviation, kurtosis, skew, correlation(s) between color channels) may be computed from the ground projections (or a portion thereof, such as a majority cluster) and used to modify the colors of the target frame to have updated color statistics that match those from the ground projection of the reference frame, thereby harmonizing color across the reference and target frames.

20 Claims, 20 Drawing Sheets

(51) Int. Cl.
*G06T 15/20* (2011.01)
*G06V 10/10* (2022.01)
*G06V 10/25* (2022.01)
*G06V 10/56* (2022.01)

(52) U.S. Cl.
CPC .............. *G06V 10/25* (2022.01); *G06V 10/56* (2022.01); *G06T 2207/10024* (2013.01); *G06T 2207/30252* (2013.01)

(56) References Cited

U.S. PATENT DOCUMENTS

| | | | |
|---|---|---|---|
| 2015/0302561 A1* | 10/2015 | Pekkucuksen | G06T 3/4038 |
| | | | 382/275 |
| 2017/0116703 A1* | 4/2017 | Sundareson | G06T 15/005 |
| 2020/0195846 A1 | 6/2020 | Appia et al. | |
| 2020/0406897 A1* | 12/2020 | Hartmann | B60W 40/06 |
| 2021/0027522 A1* | 1/2021 | Dabral | G06T 15/20 |
| 2021/0209737 A1* | 7/2021 | Hua | G06T 7/60 |

OTHER PUBLICATIONS

"Gamma correction", Wikipedia, Retrieved from Internet URL: https://en.wikipedia.org/wiki/Gamma_correction, accessed on Jun. 13, 2022, 1-13 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

"Tone mapping", Wikipedia, Retrieved from Internet URL: https://en.wikipedia.org/wiki/Tone_mapping, accessed on Jun. 13, 2022, 1-7 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Pulli, K., "Camera Processing Pipeline", VP Computational Imaging Light, Retrieved from Internet URL: https://web.stanford.edu/class/cs231m/lectures/lecture-11-camera-isp.pdf, accessed on Jun. 14, 2022, pp. 1-78.

Reinhard, E. et al., "Color Transfer between Images", IEEE Computer Graphics and Applications, Retrieved from Internet URL: https://www.cs.tau.ac.il/~turkel/imagepapers/ColorTransfer.pdf, pp. 34-41 (Sep./Oct. 2001).

U.S. Appl. No. 17/139,587, filed Dec. 31, 2020.

Non-Final Office Action, U.S. Appl. No. 17/959,940, Notification Date: Mar. 27, 2025, 6 pages.

Eker, Onur, et al. "A Real-time 3D Surround View Pipeline for Embedded Devices." VISIGRAPP (4: VISAPP). 2022, 7 pages.

International Preliminary Report on Patentability, Patent Cooperation Treaty, International Application No. PCT/US2023/0340014, Notificiation Date: Mar. 1, 2025, 9 pages.

International Searching Authority, Patent Cooperation Treaty, International Application No. PCT/US2023/034014, Notification Date: Apr. 4, 2025, 4pages.

Reinhard, Erik, et al., "Color transfer between images." IEEE Computer graphics and applications 21.5 (2001): 34-41, 8 pages.

* cited by examiner

IMAGE STITCHING WITH COLOR HARMONIZATION FOR SURROUND VIEW SYSTEMS AND APPLICATIONS

CROSS-REFERENCE TO RELATED APPLICATIONS

This application is related to U.S. patent application Ser. No. 17/959,940, entitled "Image Stitching with Color Harmonization of De-processed Images for Surround View Systems and Applications," filed Oct. 4, 2022.

BACKGROUND

Surround view systems (SVS) provide occupants of an ego-machine with a visualization of an area surrounding the ego-machine. For example, a SVS provides the driver and/or occupants with the ability to view the surrounding area, including blind spots where a line of sight is occluded by a portion of the ego-machine and/or other objects in the environment, without the need to reposition (e.g., turn their head, get up from their seat, lean a certain direction, etc.). This visualization may assist and facilitate a variety of driving maneuvers, such as smoothly entering or exiting a parking spot without hitting objects such as a road curb, pedestrians, or other vehicles or dynamic objects. More and more vehicles, especially luxury brands and new models, are being produced with SVS capability.

Existing SVS usually use fisheye cameras—typically mounted at the front, left, rear, and right sides of the vehicle body—to perceive the surrounding area from multiple directions. Additional cameras may be included in special cases, like for long trucks or vehicles with trailers. Frames of image data from the individual cameras are stitched together using camera parameters to align frames and blending techniques to combine overlapping regions to provide a horizontal 360° surround view visualization.

However, a camera's sensor array may capture light under different conditions than human vision, and an image generated from sensor data may represent color differently than the way our eyes perceive it. Moreover, different sensors or different conditions applicable to the same sensor types can produce images of an environment that do not appear to match from image to image. In some cases, mismatched colors arise due to lighting characteristics of the environment. For example, if the sun is on one side of an ego-vehicle, if an ego-vehicle is entering a parking structure or tunnel, or an ego-vehicle is partially in shade, one side of the ego-vehicle may be exposed to more light than the other, such that a camera on the brighter side may create a different exposure or use different automated settings, and therefore may capture color differently than a camera on the other side. Another way mismatched colors can arise is through image processing, which is typically applied to each frame of image data individually, resulting in different changes to different images. Example image processing may include gamma correction to improve color range, exposure compensation, tone mapping, noise reduction, removing bad pixels, applying white balance, applying color correction to remove lens shading artifacts in fisheye images, and/or others. However, since image processing evaluates and operates on each image independently of other images, it often contributes to mismatched colors in different images of the same environment.

One existing technique for harmonizing color among different images of the same environment chooses one of the images as a reference image, determines global color statistics for the reference image, and transfers the global color statistics to the other images to match their global color statistics to those of the reference image. However, this technique is often ineffective at harmonizing color; for example, when different cameras view different objects or different parts of the same object. Applying a stitching algorithm using unharmonized camera images as input results in an unharmonized stitched image that has noticeable color mismatches at the seams where two images were stitched together, which may be perceived as artifacts. As such, conventional techniques generate distracting artifacts in regions of a stitched image that are potentially important for a driver or autonomous system to safely maneuver a vehicle. As a result, there is a need for improved color harmonization techniques that improve the visual quality of stitched images.

SUMMARY

Embodiments of the present disclosure relate to color harmonization across multiple camera sensors. More specifically, systems and methods are disclosed in which color statistics from a ground projection of a reference frame of image data are transferred to a target frame of image data.

In contrast to conventional systems, such as those described above, color statistic(s) of ground projections of the reference and target frames may be used to harmonize color between the reference and target frames. At a high level, reference and target frames may be identified from frames of image data that represent overlapping views of an environment (e.g., surrounding an ego-object such as an ego-vehicle). The reference and target frames may be projected onto a representation of the ground (e.g., a ground plane) of the environment, an overlapping region between these projections may be identified, and the portion of each projection that lands in the overlapping region may be taken as a corresponding ground projection. Instead of computing color statistics over the entire reference and target frames, one or more color statistics (e.g., a statistical moment or property of one or more color channels) may be computed for each of the ground projections (or a portion thereof, such as a majority cluster). As such, the color statistic(s) from the ground projections may be used to modify the colors of the target frame to have an updated color statistic(s) that matches those from the ground projection of the reference frame. Transferring color statistics from ground projections in this manner instead of from an entire image improves color harmonization and visual quality of stitched images over prior techniques that transfer global color statistics from an entire image.

BRIEF DESCRIPTION OF THE DRAWINGS

The present systems and methods of color harmonization for stitched images in autonomous systems and applications are described in detail below with reference to the attached drawing figures, wherein.

DETAILED DESCRIPTION

Figure 1:
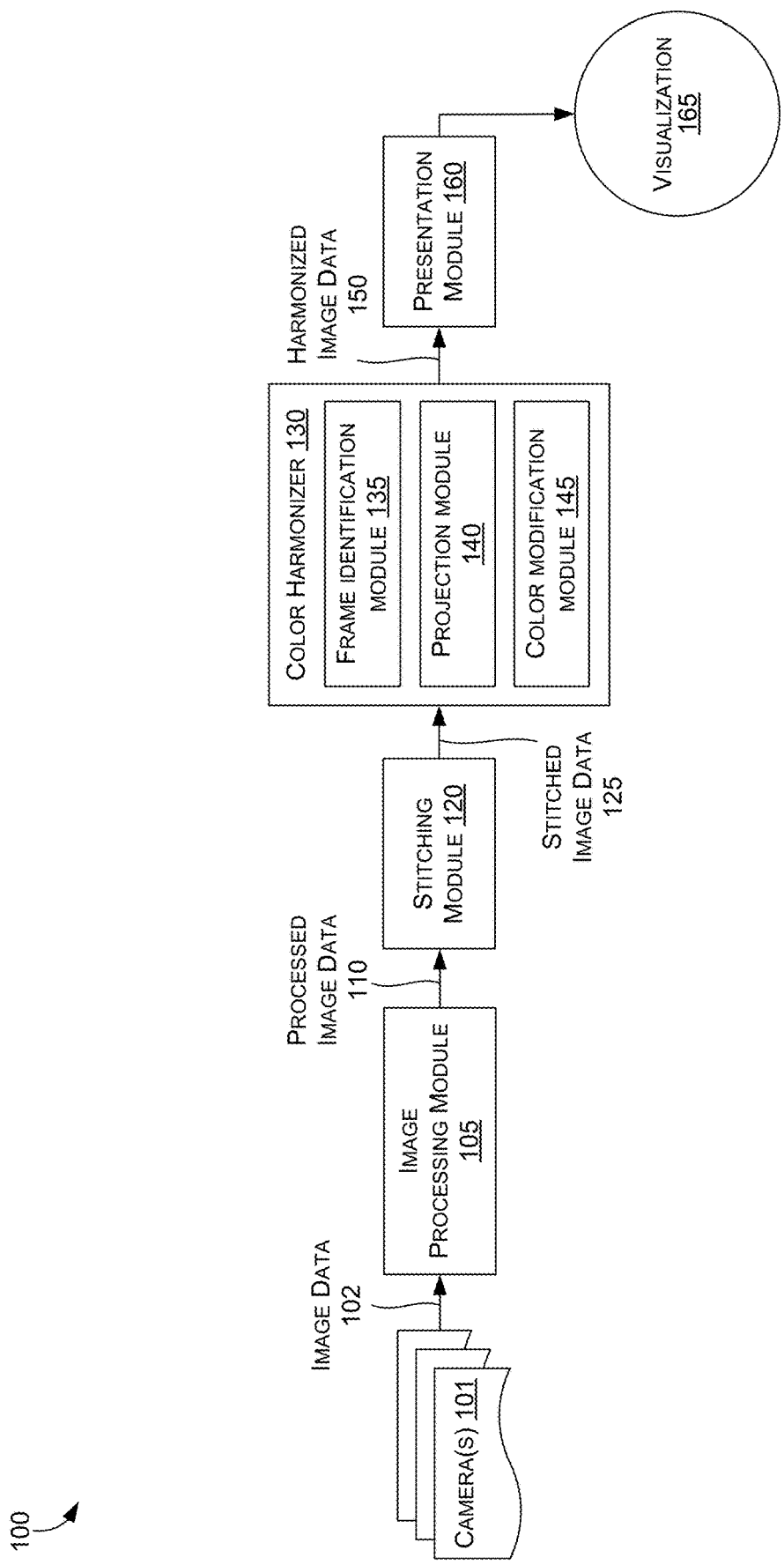
FIG. 1 is a diagram illustrating an example data flow through an example Surround View System (SVS), in accordance with some embodiments of the present disclosure.

Systems and methods relating to color harmonization for stitched images are disclosed. For example, systems and methods are disclosed that transfer color statistics from ground projections of a reference frame of image data to target frames of image data. The present techniques may be used to visualize an environment around an ego-object, such as a vehicle, robot, and/or other type of object, in systems such as parking visualization systems, Surround View Systems (SVS), and/or other systems.

Although the present disclosure may be described with respect to an example autonomous vehicle 1200 (alternatively referred to herein as "vehicle 1200" or "ego-machine 1200," an example of which is described with respect to FIGS. 12A-12D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to image stitching for Surround View Systems, this is not intended to be limiting, and the systems and methods described herein may be used in augmented reality, virtual reality, mixed reality, robotics, security and surveillance, autonomous or semi-autonomous machine applications, and/or any other technology spaces where image stitching may be used.

At a high level, color harmonization may be applied to frames of image data that were captured using different cameras and/or that represent overlapping views of an environment (e.g., surrounding an ego-object such as an ego-vehicle) at substantially the same time or time slice. More specifically, reference and target frames may be identified from the frames (e.g., based on direction of ego-motion, active viewport, operator gaze, brightest color, patch uniformity, and/or other factors), and ground projections of the reference and target frames may be used to transfer a color statistic(s) (e.g., a statistical moment or property of one or more color channels, such as mean, variance, standard deviation, kurtosis, skew, and/or correlation(s) between color channels) from the ground projection of the reference frame to the target frame by modifying the colors of the target frame to have the same color statistic(s) as the ground projection of the reference frame (or a portion thereof). In some embodiments, after transferring color statistics from a reference frame to an adjacent target frame, the process is repeated using the updated target frame as a new reference frame and transferring color statistics from a ground projection of the new reference frame to the next adjacent target frame. In some embodiments involving a 360° surround view visualization (or at least a partially surround view visualization generated using stitched images from two or more image sensors), the process may be repeated to loop around the frames, and any known computer vision loop closure technique may be applied to close the loop with the original reference frame and/or any known global optimization technique may be applied to improve color harmonization.

In some implementations, color harmonization may be applied in an image processing pipeline, and at any stage of the pipeline. For example, in some embodiments that include multiple cameras capturing different frames of image data, each camera may be controlled by its own capturing algorithm that runs independently of those running for other cameras. The frames of image data may be processed using various types of image processing to generate frames of processed image data, and the frames of processed image data may be stitched together to form stitched image data (e.g., a 360° surround view visualization, a panorama, etc.). Depending on the embodiment, color harmonization may be applied to the image data, the processed image data, deprocessed image data, or the stitched image data.

With respect to deprocessed image data, in some embodiments, some or all of the image processing used to generate the frames of processed image data may be inverted to transform the frames of processed image data into deprocessed image data in a common (reference) light space of linear light, and color harmonization may be applied to the deprocessed image data in the reference light space. More specifically, each camera may be associated with a capturing algorithm that determines one or more capture configuration parameters used to control an image sensor in the camera and to perform image processing on captured image data. Example capture configuration parameters include sensor exposure time, analog-to-digital gain, an Optical-Electro Transfer Function (OETF) curve (also called a gamma curve), a tone mapping curve, auto white balance (AWB) correction coefficients, and a lens shading profile, to name a few non-limiting examples. The image sensor may capture image data (e.g., pixel values) in one or more color channels, which, prior to image processing, are in a linear light space—meaning the values from the image sensor are proportional to the illuminance in the captured scene. Various types of image processing may be applied to the captured image data (e.g., gamma correction to improve color range, exposure compensation, tone mapping, noise reduction, removing bad pixels, applying white balance, applying color correction to remove lens shading artifacts in fisheye images, etc.), which may involve one or more nonlinear transformations. As a result, the image processing may transform the captured image data from a linear light space to a nonlinear space.

Accordingly, the image processing may be inverted using the capture configuration parameters for each frame to transform the processed image data back into a linear light space (or some other reference light space, such as one that approximates the illuminance of the scene better than the processed image data), and color harmonization may be applied in the reference (e.g., linear) light space. Multiple stages of image processing may be inverted in reverse order (e.g., if tone mapping was applied at the end of the image processing pipeline, inverse tone mapping may be applied first using the inverse curve). In some cases, one or more stages of image processing may be omitted from the inverse image processing (e.g., because it may not be possible or practical to invert some types of image processing, such as denoising or sharpening). As such, inverse image processing may be applied to transform processed image data into deprocessed image data in a reference light space, and color harmonization may be applied on the deprocessed image data in the reference light space. Applying color harmonization across different frames in a common (reference) or linear light space tends to improve the results of color harmonization over applying it across different frames in different or nonlinear light spaces, since common and linear light spaces are more conducive to transferring color statistics from frame to frame.

After harmonizing color on deprocessed image data, corresponding image processing may be reapplied to the harmonized image data using corresponding capture configuration parameters. In some embodiments, a reapplication of a particular type of image processing may use a combined capture configuration parameter that averages, approximates, or otherwise combines the capture configuration parameters used to generate different frames in a set of frames representing a common time slice. For example, assume four different tone mapping curves were applied (and inverted) for four different frames of image data. To reapply tone mapping after color harmonization, the four different tone mapping curves may be averaged, and the resulting average tone mapping curve may be applied to each frame of harmonized image data.

In some embodiments that harmonize color among a set of frames, a reference frame may be selected from the set in various ways. For example, a reference frame (e.g., an image) may be selected to correspond with a direction of ego-motion (e.g., use an image from a forward facing camera when moving forward), an active viewport (e.g., use an image from a camera pointing in the direction of an active viewport), or operator gaze (e.g., use an image from a camera pointing in the direction of the gaze of an operator of the ego-object). In some embodiments, an image in which the brightest tone is not white may be invalidated for use as a reference frame. For example, assume an ego-vehicle drives past a bright object such as a red fence. Applying auto white balance to an image of that red fence may lead to an incorrect result since auto white balance typically assumes the brightest tone is white, so it may not be desirable to replicate the color statistics from that image. In some embodiments, each image may be decomposed into a plurality of patches, color statistic(s) may be computed for each patch, and the image with the most uniform patches (e.g., based on a measure of similarity of their color statistic(s)) may be selected as a reference frame. Choosing an image with the most uniform patches may indicate fewer objects and therefore more reliable and more representative color information to transfer over to other images. These are just a few examples, and other ways of selecting a reference frame may be implemented within the scope of the present disclosure.

In some embodiments, a state machine may be used to determine whether and how to transfer color statistics from a reference frame to an adjacent target frame. More specifically, for each set of frames captured at substantially the same time or otherwise representing the same time slice, a reference frame and an adjacent target frame may be selected. The image data from each frame may be projected onto a three-dimensional (3D) representation of the ground of the environment (e.g., a ground plane). Some embodiments model the geometry of the environment surrounding the vehicle as a 3D bowl shape comprising a circular ground plane for the inner portion of the bowl connected to an outer bowl represented as a curved surface rising from the ground plane to a height or a slope that increases proportionally to the distance from the bowl center. In some such embodiments, the image data from each frame is projected onto the 3D bowl, and the portion of the image data that was projected onto the outer bowl is discarded, leaving a portion (e.g., a wedge) of a circular inner ground projection from each frame. The region of overlapping image data between the ground projections of the reference and target frames may be identified, and a determination whether or not any pixels in this overlapping region belong to a detected object may be made. For example, object detection may be performed using two-dimensional (2D) object detection (e.g., from images) or 3D object detection (e.g., from images, a 3D point cloud of LiDAR or RADAR detections), a representation of the detected objects (e.g., an object or segmentation mask) may be projected onto the ground plane, and each pixel in the overlapping region may be compared against a corresponding pixel of the projected representation of the detected objects (e.g., projected object and/or segmentation mask(s) generated from the reference and/or target frames) to determine whether the pixel belongs to a detected object.

If a determination is made that there are no detected objects (or less than or equal to a threshold number of detected object pixels, such as zero) in the overlapping region, color statistics may be transferred from the ground projection of the reference frame to the target frame. If a determination is made that there is more than some designated threshold number or percentage of pixels in the overlapping region (e.g., 50%) that belong to a detected object, the ground projection of the reference frame from the preceding time slice may be used to transfer color statistics to the target frame. If there is less than the designated threshold number or percentage of points or pixels, those points or pixels may be removed from the ground projection for the target and source frames, the remaining pixels from each ground projection may be clustered (e.g., using k-means clustering), and the majority cluster from each ground projection may be used to transfer the color statistics from the majority cluster from the ground projection of the reference frame to the target image.

In some embodiments, transferring color statistics from a reference frame of image data (e.g., a ground projection or a majority cluster thereof) to a target frame of image data (e.g., an entire target image) involves a color statistic(s) for both the ground projection (or a majority cluster thereof) of the reference frame and the ground projection (or a majority cluster thereof) of the target frame. For example, for each pixel in the target frame (e.g., and each color channel), the mean color of the ground projection (or a majority cluster thereof) of the reference frame may be subtracted from the color of the pixel (e.g., to represent color variance, or per channel color variance), scaled by the ratio of the standard deviation of the colors of the pixels in the ground projection (or a majority cluster thereof) of the reference frame to the standard deviation of the colors of the pixels in the ground projection (or a majority cluster thereof) of the target frame, and added to the mean color of the ground projection (or a majority cluster thereof) of the reference frame. In another example, a color covariance matrix representing correlations between color channels may be transferred from a ground projection (or a majority cluster thereof) of a reference frame to a target frame. Transferring a color covariance matrix may yield a better color transfer than prior techniques, for example, in scenarios where differences in hue between frames are due to corresponding views lit with varying illuminants resulting in different auto white balance coefficients. Generally, any color statistic may be computed and transferred using any suitable color space (e.g., RGB, YCbCr, IPT, CIELAB).

In contrast to conventional systems that transfer color statistics to an entire target frame, in some embodiments, reference and target frames of image data may be divided into segments or columns, and color statistics may be transferred from segment or column to adjacent segment or column. More specifically, color statistics may be transferred from one segment or column (or a ground projection thereof) to another segment or column within a reference frame, and then from the last segment or column of the reference frame to the first segment or column of the target frame at the boundary between the frames. As such, color statistics may be gradually transferred from (e.g., a ground projection of) a reference frame to a target frame. In some embodiments involving a stitched 360° surround view visualization, color statistics may be gradually transferred from reference segment to target segment corresponding to a loop around the stitched 360° surround view visualization. Transferring color statistics this way may yield a better color transfer and prevent over or under exposing a stitched 360° surround view visualization. In some embodiments, to achieve a smooth transition, weighting may be applied during the color transfer more heavily at the boundaries between frames than in the frame centers, which may result in the center of the frames representing image data that is more true to each camera with smooth transitions at the boundaries of the frames.

In some embodiments involving a stitched 360° surround view visualization, color statistics may be transferred from frame to adjacent frame, effectively looping through image space (whether clockwise or counterclockwise). In some situations, transferring color statistics from frame to frame may result in some finite error, such that transferring color statistics to subsequent frames serves to accumulate error. As such, in some embodiments, any known computer vision loop closure technique may be performed to reduce accumulated error. Additionally or alternatively, a global optimization may be performed to improve color harmonization, such as applying one or more geometric or photometric transforms and looping until one or more composition quality scores are all above or equal to a threshold value, as described in U.S. patent application Ser. No. 17/139,587, filed Dec. 31, 2020.

Various aspects of the present color harmonization techniques provide a number of advantages and benefits over prior techniques. For example, transferring color statistics from ground projections instead of from an entire image effectively improves color harmonization and therefore visual quality of stitched images over prior techniques that transfer global color statistics from an entire image. More specifically, global color statistics for images that include objects effectively represent different lighting conditions in the same image, since objects are often lit differently than the ground. By contrast, ground projections will usually represent more consistent lighting since different ground projections are in the same plane (the ground plane), so using color statistics from ground projections are often more reliable and include more representative color information to transfer over to other images. Moreover, using color statistics from ground projections of each frame, rather than using global color statistics for the entire frame, reduces computational demands and therefore reduces latency over prior techniques. Furthermore, some embodiments facilitate improved parallelization by performing certain calculations in parallel (e.g., computing ground projections for each frame, computing each overlapping region between each adjacent pair of frames, computing color statistics from each ground projection or majority cluster), further reducing latency over prior techniques. Embodiments that leverage color statistics from a preceding time slice obviate the need to compute color statistics for a current time slice, further reducing latency over prior techniques. As such, the techniques described herein may be used to improve visual quality of stitched images, reduce latency in generating harmonized stitched images, and therefore promote safe operation of an ego-machine.

With reference to FIG. 1, FIG. 1 is a diagram illustrating an example data flow through an example Surround View System (SVS) 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

At a high level, the example Surround View System 100 generates a visualization 155 of a 3D environment (e.g., around an ego-object, such as a vehicle) based on frames of image data 102 of the environment. The frames of image data 102 may be captured by one or more cameras 101 of an ego-object or ego-actor (e.g., autonomous vehicle 1200 of FIGS. 12A-12D, also referred to as the vehicle 1200) as the ego-object or ego-actor navigates through the 3D environment. An image processing module 105 may process the frames of image data 102 using any number and type of known image processing techniques to generate frames of processed image data 110. A stitching module 120 may stitch the frames of processed image data 110 into stitched image data 125 (e.g., a 360° surround view visualization, a panorama). A color harmonizer 130 may harmonize color across portions of the stitched image data 125 that come from different frames of processed image data 110 to generate harmonized image data 150 (e.g., a harmonized 360° surround view visualization, a harmonized panorama). A presentation module 160 may cause presentation of a visualization 165 of at least a portion of the harmonized image data 150 (e.g., on a monitor visible to an occupant or operator of the ego-object or ego-actor). In some embodiments, the presentation module 160 projects the harmonized image data 150 onto a 3D representation of the 3D environment (e.g., a 3D bowl that models the 3D environment), renders a view of the projected harmonized image data from the perspective of a virtual camera, and causes presentation of the rendered view as the visualization 165.

Generally, color harmonization may be performed on image data 102, processed image data 110, and/or stitched image data 125 from any number and any type of camera (e.g., the camera(s) 101), such as those described below with respect to the autonomous vehicle 1200 of FIGS. 12A-12D. The camera(s) 101 may include one or more cameras of an ego-object or ego-actor, such as stereo camera(s) 1268, wide-view camera(s) 1270 (e.g., fisheye cameras), infrared camera(s) 1272, surround camera(s) 1274 (e.g., 360° cameras), and/or long-range and/or mid-range camera(s) degree 1298 of the autonomous vehicle 1200 of FIGS. 12A-12D—and the cameras(s) 101 may be used to generate the image data 102 of the 3D environment around the ego-object or ego-actor. In embodiments where multiple cameras are used, the multiple cameras may view a common region of the 3D environment with an overlapping portion of their respective fields of view such that the image data 102 (e.g., images) from different cameras represents the common region. Each frame of image data 102 may be processed by the image processing module 105 using any number or types of image processing techniques (e.g., gamma correction, exposure compensation, tone mapping, noise reduction, removing bad pixels, applying white balance, applying color correction to remove lens shading artifacts in fisheye images) to generate a frame of processed image data 110. Frames of processed image data 110 may be stitched together by the stitching module 120 (e.g., using any known stitching technique and/or as described in greater detail with respect to the stitching module 1006 of FIG. 10). In the implementation illustrated in FIG. 1, the color harmonizer 130 applies color harmonization to the stitched image data 125, but this need not be the case. For example, color harmonization may be applied to frames of processed image data 110 generated by the image processing module 105 to generate harmonized frames of image data, and the harmonized frames of image data may be stitched together by the stitching module 120. Generally, color harmonization may be performed at any stage of an image processing pipeline, depending on the implementation.

At a high level, the color harmonizer 130 may include a frame identification module 135 that identifies or accepts an identification of a reference frame of image data (e.g., an image or portion of a stitched image from a particular camera) from which color statistics should be transferred, and a target frame of image data (e.g., another image or another portion of a stitched image from a different camera) which should be modified so its color statistics match those of a ground projection of the reference frame (or portion thereof). Given a reference frame and a target frame, a projection module 140 of the color harmonizer 130 may generate ground projections of the reference and target frames, for example, by projecting the reference and target frame onto corresponding portions of a ground plane of (e.g., a 3D bowl that models) the 3D environment represented by the reference and target frames and identifying a portion of each projection that lands in an overlapping region between the two projections as the ground projection for each frame. A color harmonization module 145 of the color harmonizer 130 may compute one or more reference color statistics (e.g., any statistical moment or property of one or more color channels, such as mean, variance, standard deviation, kurtosis, skew, and/or correlation(s) between color channels) for the pixels in the ground projection of the reference frame (or a portion thereof), and transfer the one or more reference color statistics to the target frame by modifying the colors of the target frame to match the one or more reference color statistics. In some embodiments where there is a series or a loop of overlapping frames (e.g., a panorama or 360° surround view visualization), the color harmonizer 130 may repeat the process, harmonizing color in successive pairs of (e.g., overlapping) frames, in any direction. In some embodiments involving a 360° surround view visualization, the color harmonizer 130 may perform any known computer vision loop closure technique and/or global optimization to improve color harmonization Frame identification module 135 may identify a reference frame in various ways. For example, in embodiments where the camera(s) 101 are used to generate frames (e.g., frames of the image data 102, frames of the processed image data 110, different portions of the stitched image data 125) representing different views of a 3D environment surrounding an ego-object (e.g., a vehicle), the frame identification module 135 may select one of the frames as a reference frame to correspond with a direction of ego-motion (e.g., use image data corresponding to one of the camera(s) 101 that is facing forward when moving forward), an active viewport into the 3D environment (e.g., use image data corresponding to one of the camera(s) 101 that points in the direction of an active viewport displayed on a monitor visible to an occupant or operator of the ego-object), or operator gaze (e.g., use image data corresponding to one of the camera(s) 101 that points in the direction of the gaze of an operator of the ego-object). In embodiments where color harmonization is applied after stitching to different portions of a stitched image, the frame identification module 135 may determine which pixels of the stitched image come from which camera, and the frame identification module 135 may identify reference and target frames as the pixels of the stitched image that come from corresponding cameras. In some embodiments, the frame identification module 135 may determine not to select a frame in which the brightest tone is not white, in which case, the frame identification module 135 may identify an alternate frame (e.g., an adjacent frame) as the reference frame. In some embodiments, the processed image data 110 generated by the image processing module 105 may identify a plurality of patches for each frame and represent color statistics computed for each patch by the image processing module 105, and the frame identification module 135 may select a frame having the most uniform patches (e.g., based on a measure of similarity of their color statistics) from a set of candidate frames (e.g., representing the same time slice) as the reference frame. These are just a few examples, and other ways of selecting a reference frame may be implemented within the scope of the present disclosure.

The projection module 140 may generate ground projections of the reference and target frame. Generally, the reference and target frame may each include a 2D representation of a 3D environment, and the projection module 140 may project each frame (or a portion thereof) onto a representation of the ground of the 3D environment (e.g., a ground plane). In some embodiments, the projection module 140 may limit the ground projection to within a particular radius of the ego-object (e.g., three meters). For example, some embodiments may model the geometry of the 3D environment as a 3D bowl comprising a circular ground plane centered on the ego-object and an outer bowl represented as a curved surface rising from the ground plane, and the projection module 140 may project each frame (or a portion thereof) onto the ground plane of the 3D bowl. In some embodiments, the projection module 140 may identify the portion of each projection that lands in an overlapping region between the two projections as the corresponding ground projection for each frame.

Figure 2:
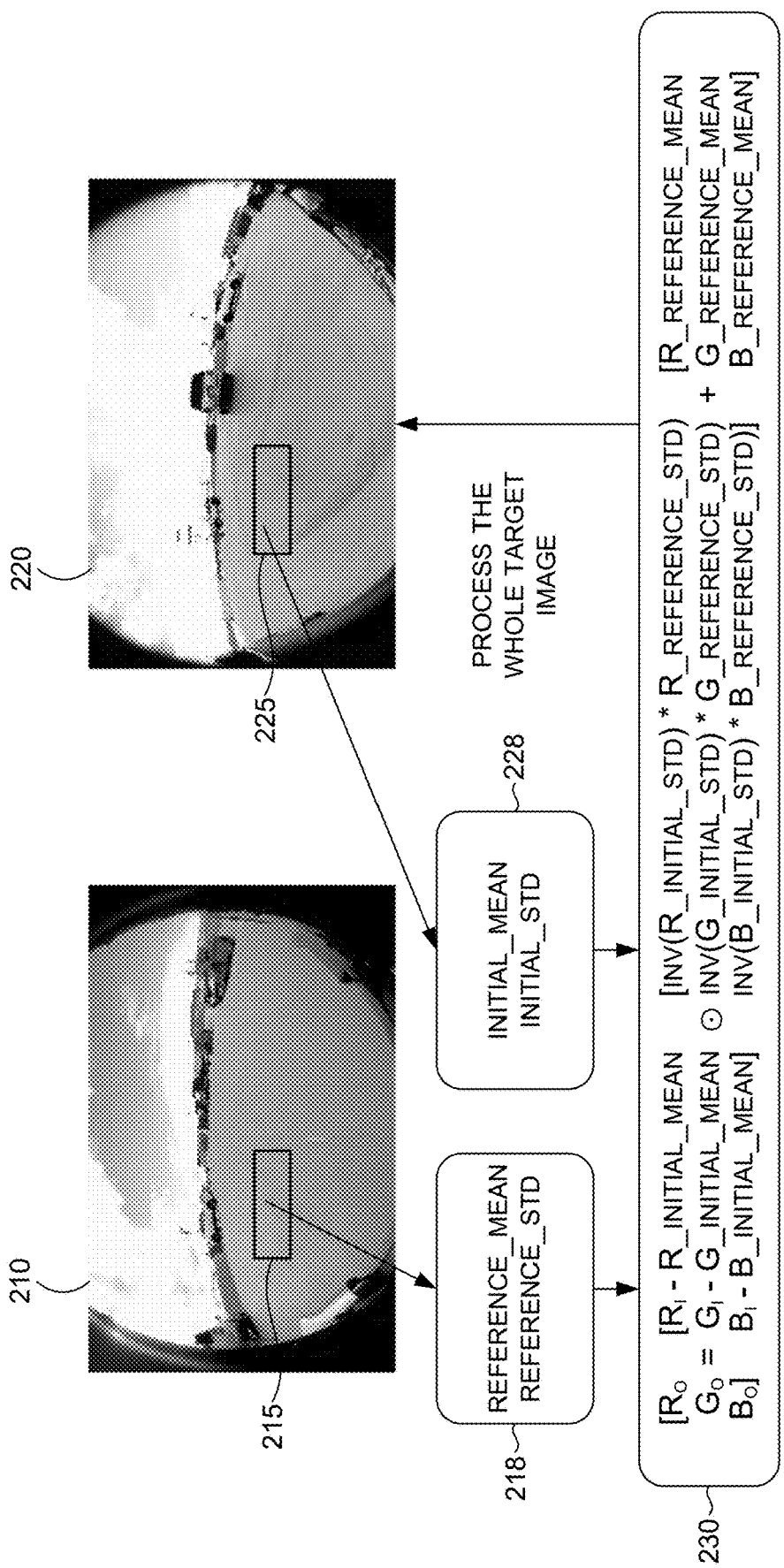
FIG. 2 is a diagram illustrating an example technique for transferring color statistics from a ground projection of a reference frame to a target frame, in accordance with some embodiments of the present disclosure.

At a high level, the color modification module 145 may compute and transfer color statistic(s) from the ground projection of the reference frame to the target frame. FIG. 2 is a diagram illustrating an example technique for transferring reference color statistics 218 from a ground projection 215 of a reference frame 210 (or a portion thereof) to a target frame 220, in accordance with some embodiments of the present disclosure. In this example, the reference frame 210 includes a ground projection 215, and the target frame 220 includes a ground projection 225. Reference color statistics 218 may be computed from some or all pixels that belong to the ground projection 215 of the reference frame 210, and initial color statistics 228 may be computed from some or all pixels that belong to the ground projection 225 of the target frame 220. In the example, illustrated in FIG. 2, the reference color statistics 218 from the reference frame 210 and the initial color statistics 228 from the target frame 220 include per-channel mean and standard deviation in RGB space. The example color statistics transfer 230 represents an example technique for transferring the reference color statistics 218 from the ground projection 215 of the reference frame 210 to the target frame 220. Using the example color statistics transfer 230, the input color(s) of each pixel $R_i$, $G_i$, $B_i$ of the target frame 220 are modified to become output colors $R_o$, $G_o$, $B_o$ using the color statistics for each ground projection, where $\odot$ denotes an element-wise multiplication. This is just an example color statistics transfer technique, and others may be implemented within the scope of the present disclosure. For example, a color covariance matrix representing correlations between color channels may be transferred from a ground projection (or a majority cluster thereof) of a reference frame to a target frame. Generally, color statistics may be computed using any suitable color space (e.g., RGB, YCbCr, IPT, CIELAB).

Figure 3:
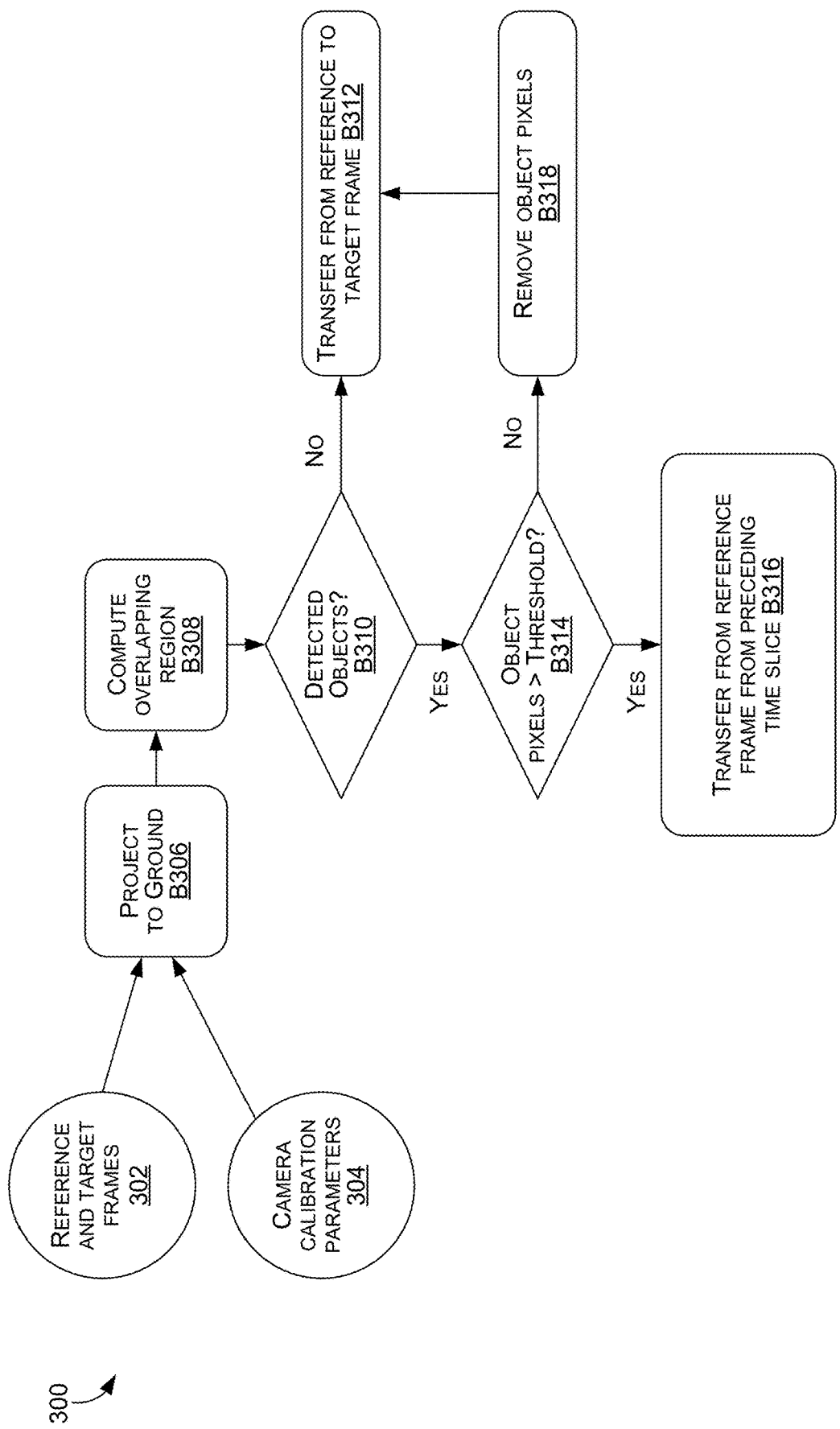
FIG. 3 is a flow diagram showing a method for applying color harmonization based at least on object detection, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 may be implemented by the color harmonizer 130 of the example Surround View System 100 of FIG. 1. However, this method may additionally or alternatively be executed by any one system, or any combination of systems, including, but not limited to, those described herein.

FIG. 3 is a flow diagram showing a method 300 for applying color harmonization based at least on object detection, in accordance with some embodiments of the present disclosure. The method 300 may be used to harmonize color within successive sets of frames of image data representing a 3D environment in successive time slices. Each set may include two or more frames of image data. In a non-limiting example, each set includes four fisheye images and/or a stitched image combining four fisheye images generated using four cameras pointing in different directions in the 3D environment (e.g., front, right, back, left). Any suitable technique may be used to select reference and target frames 302 (e.g., from the set of frames that represents each time slice), such as those described herein (e.g., with respect to frame identification module 135 of FIG. 1). In embodiments where color harmonization is applied after stitching to different potions of a stitched image, a determination of which pixels of the stitched image come from which camera may be made, so the reference and target frames may be identified as the pixels of the stitched image that come from corresponding cameras.

The method 300, at block B306, includes projecting the reference and target frames 302 onto corresponding portions of a representation of the ground of the 3D environment using camera calibration parameters 304 representing the corresponding camera's position and orientation in the 3D environment. For example, with respect to FIG. 1, the projection module 140 may project each frame onto a 3D bowl that models the 3D environment to generate a projected 3D bowl representation of the image data from the frame, discard the portion of the projected 3D bowl representation corresponding to the outer bowl, and retain the portion of the projected 3D bowl representation corresponding to the ground plane of the 3D environment.

The method 300, at block B308, includes computing an overlapping region between the projections of the reference and target frames. For example, with respect to FIG. 1, the projection module 140 may identify the portion of each projection that lands in an overlapping region between the two projections as the corresponding ground projection for each frame, and use the portion from each frame that lands in the overlapping region as the ground projection for that frame. The ground projections may be represented as corresponding 2D (e.g., top-down) or 3D representations of the environment that overlap with one another, forming a 2D or 3D overlapping region in which image data from the reference and target frames projects onto the same point (e.g., pixel, voxel). Taking an overlapping region in a 2D top-down representation of the 3D environment as an example, any given pixel in the overlapping region may represent different values for different ground projections.

The method 300, at decision block B310, includes determining whether there are any detected objects represented in the overlapping region (e.g., based on object or/or segmentation mask(s) corresponding to either or both overlapping ground projections). For example, object detection may be performed using two-dimensional (2D) object detection (e.g., on the reference and target frames 302) or 3D object detection (e.g., on a 3D projection of reference and target frames 302, on a 3D point cloud of LiDAR or RADAR detections), and the projection module 140 of FIG. 1 may project a representation of the detected objects (e.g., one or more object and/or segmentation masks) onto the overlapping region (e.g., of the ground plane). As such, the projection module 140 may determine whether each point or pixel in the overlapping region belongs to a detected object by determining whether a corresponding (e.g., pixel) value from the projected representation(s) of the detected objects (e.g., projected object and/or segmentation mask(s) generated from the reference frame, from the target frame, from either the reference or the target frames, from both the reference and target frames) is part of a detected object. If a determination is made that there are no detected objects represented in the overlapping region (or less than or equal to a threshold number of detected object pixels), the method 300 advances to block B312. If a determination is made that there is a detected object represented in the overlapping region, the method 300 advances to decision block B314.

The method 300, at block B312, includes transferring color statistics from the reference frame to the target frame. For example, with respect to FIG. 1, the color harmonizer 130 may compute and transfer color statistic(s) from the ground projection of the reference frame to the target frame. In some embodiments where there is a series or a loop of overlapping frames (e.g., a panorama or 360° surround view visualization), the color harmonizer 130 may repeat the process, harmonizing color across successive pairs of (e.g., overlapping) frames, in any direction.

Figure 4:
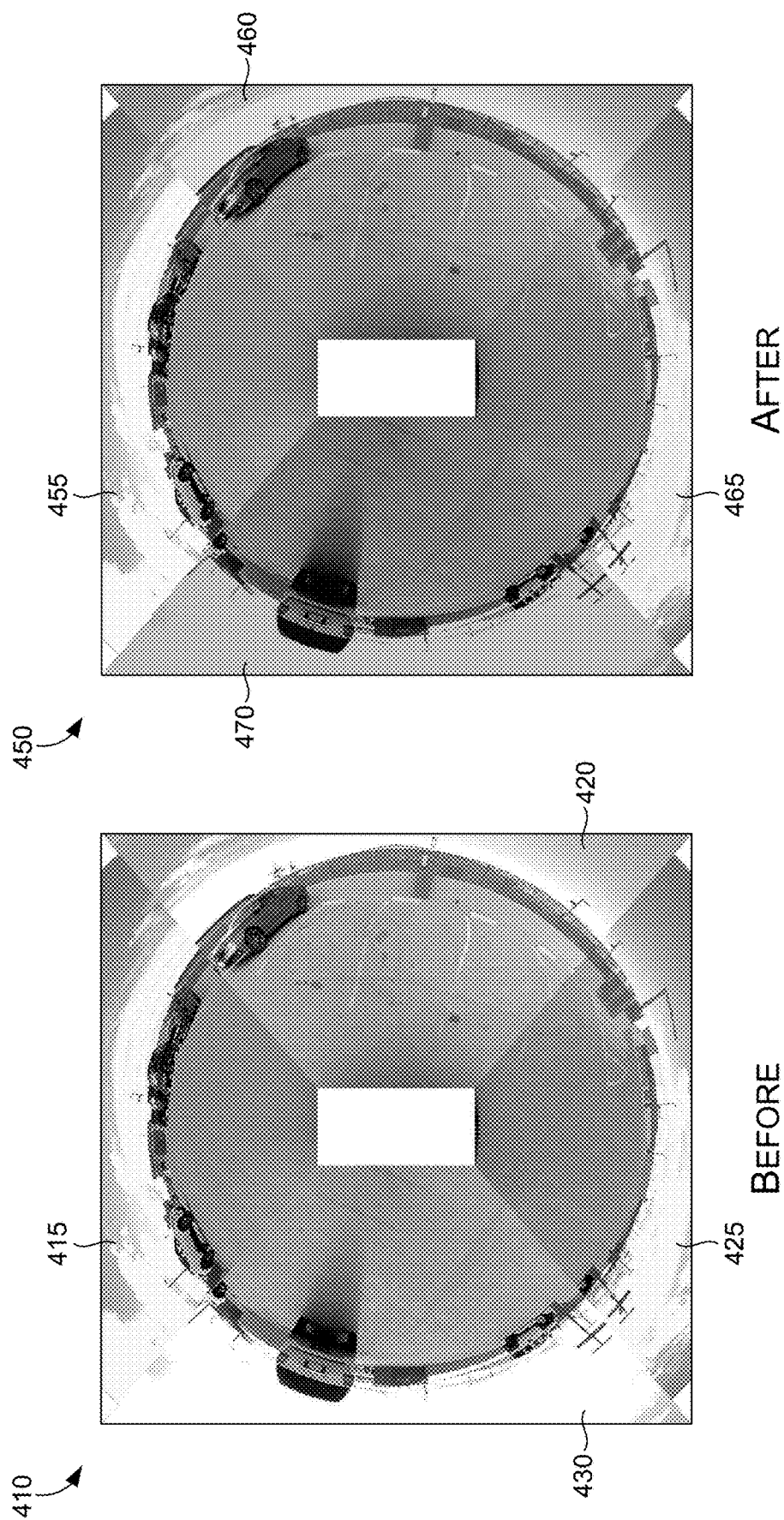
FIG. 4 illustrates visualizations of a stitched image before and after applying color harmonization using entire reference and target frames to compute color statistics, in accordance with some embodiments of the present disclosure.
Figure 5:
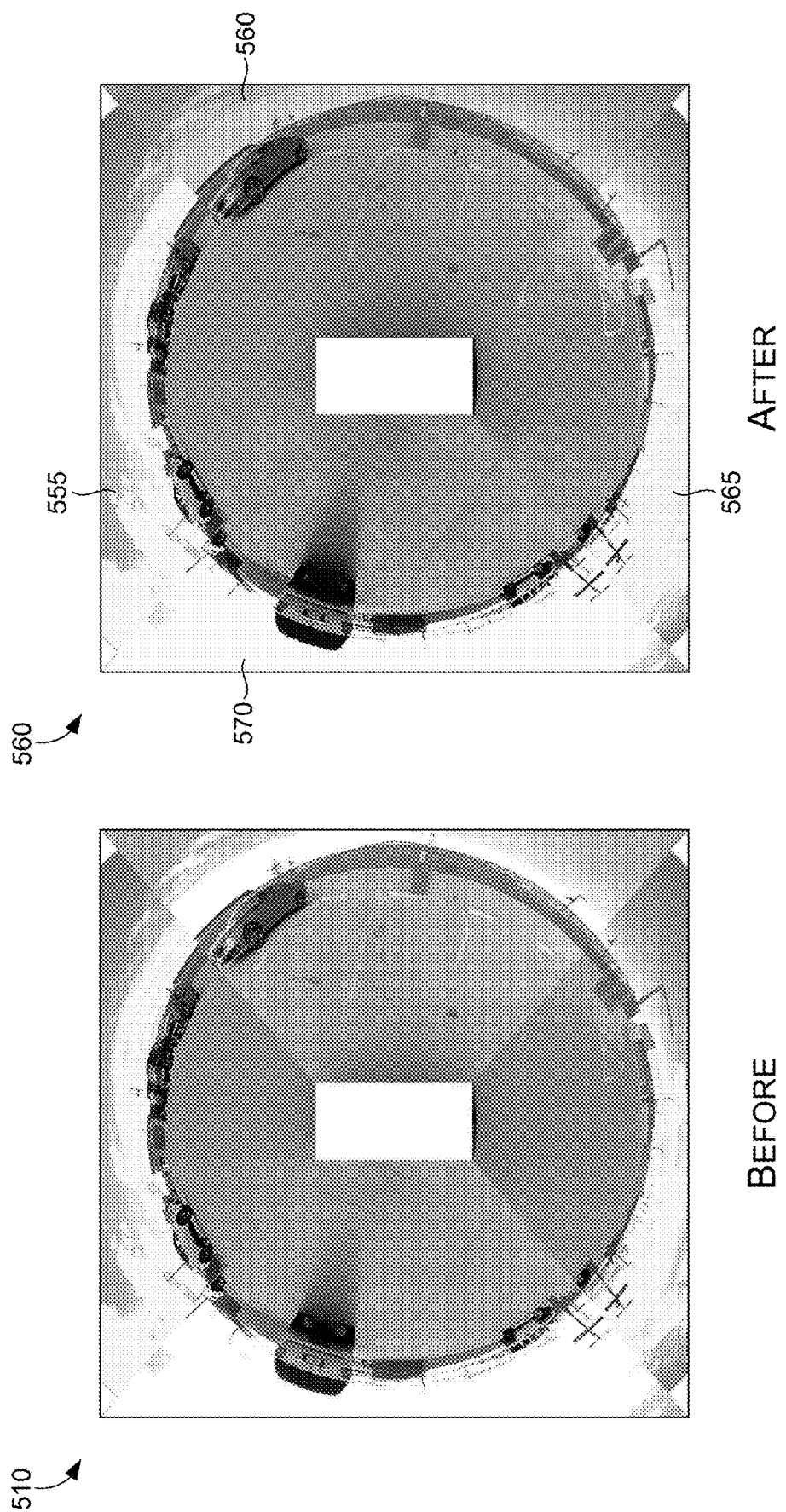
FIG. 5 illustrates visualizations of a stitched image before and after applying color harmonization using ground projections of reference and target frames to compute color statistics, in accordance with some embodiments of the present disclosure.

By way of illustration, FIG. 4 illustrates visualizations of a stitched image before (410) and after (450) applying color harmonization using entire reference and target frames to compute color statistics, and FIG. 5 illustrates visualizations of a stitched image before (510) and after (550) applying color harmonization using ground projections of reference and target frames to compute color statistics, in accordance with some embodiments of the present disclosure. In FIG. 4, the unharmonized stitched image 410 includes four frames (front frame 415, right frame 420, back frame 425, and left frame 430), and the harmonized stitched image 450 includes four frames (harmonized front frame 455, harmonized right frame 460, harmonized back frame 465, and harmonized left frame 470). In FIG. 4, color may be harmonized by transferring color statistics clockwise around the unharmonized stitched image 410 (e.g., from front frame 415 to right frame 420 to generate harmonized right frame 460, from harmonized right frame 460 to back frame 425 to generate harmonized back frame 465, from harmonized back frame 465 to left frame 430 to generate harmonized left frame 470), in each case using color statistics computed over the entire reference and target frames for each pair of frames. As such, the colors of the harmonized stitched image 450 match better than in the unharmonized stitched image 410. In another implementation, rather than computing color statistics over the entire reference and target frames, FIG. 5 represents color harmonization of the unharmonized stitched image 510 using color statistics computed over ground projections of the reference and target frames. As a result, the colors at the boundaries between the harmonized frames 555, 560, 565, and 570 of the harmonized stitched image 550 of FIG. 5 match better than in the harmonized stitched image 450 of FIG. 4.

Returning to FIG. 3, if a determination is made at decision block B310 that there is a detected object represented in the overlapping region, the method 300 advances to decision block B314, which includes determining whether or not a count or percentage of the points (e.g., pixels) that are in the overlapping region and that belong to a detected object (object points or pixels) exceeds some threshold (e.g., percentage, number of pixels). Taking an overlapping region between two 2D top-down ground projections (one for a reference frame and one for a target frame) as an example, the color harmonizer 130 of FIG. 1 may determine whether each pixel in the overlapping region belongs to a detected object by determining whether a corresponding pixel value from a projected representation(s) of the detected objects (e.g., projected object and/or segmentation mask(s) generated from the reference and/or target frames) is part of a detected object, determining a count or percentage of the pixels that belong to a detected object (e.g., based on overlapping projected mask(s) corresponding to any, either, or both the reference and/or target frames), and determining whether the count or percentage exceeds a designated threshold (e.g., 50% of the pixels in the overlapping region). If a determination is made that the count or percentage of points that are in the overlapping region and that belong to a detected object (object points or pixels) exceeds the threshold, the method 300 advances to block B316. Otherwise, the method 300 advances to block B318.

If a determination is made at decision block B314 that the count or percentage of points that are in the overlapping region and that belong to a detected object exceeds a designated threshold, the method 300 advances to block B316, which includes transferring color statistics from (the ground projection of) the reference frame from the preceding time slice to the target frame from the current time slice. For example, with respect to FIG. 1, the color harmonizer 130 may compute (or access previously computed) reference color statistics for the ground projection of the reference frame from the preceding time slice, and transfer the reference color statistics to the target frame of the current time slice.

Figure 6:
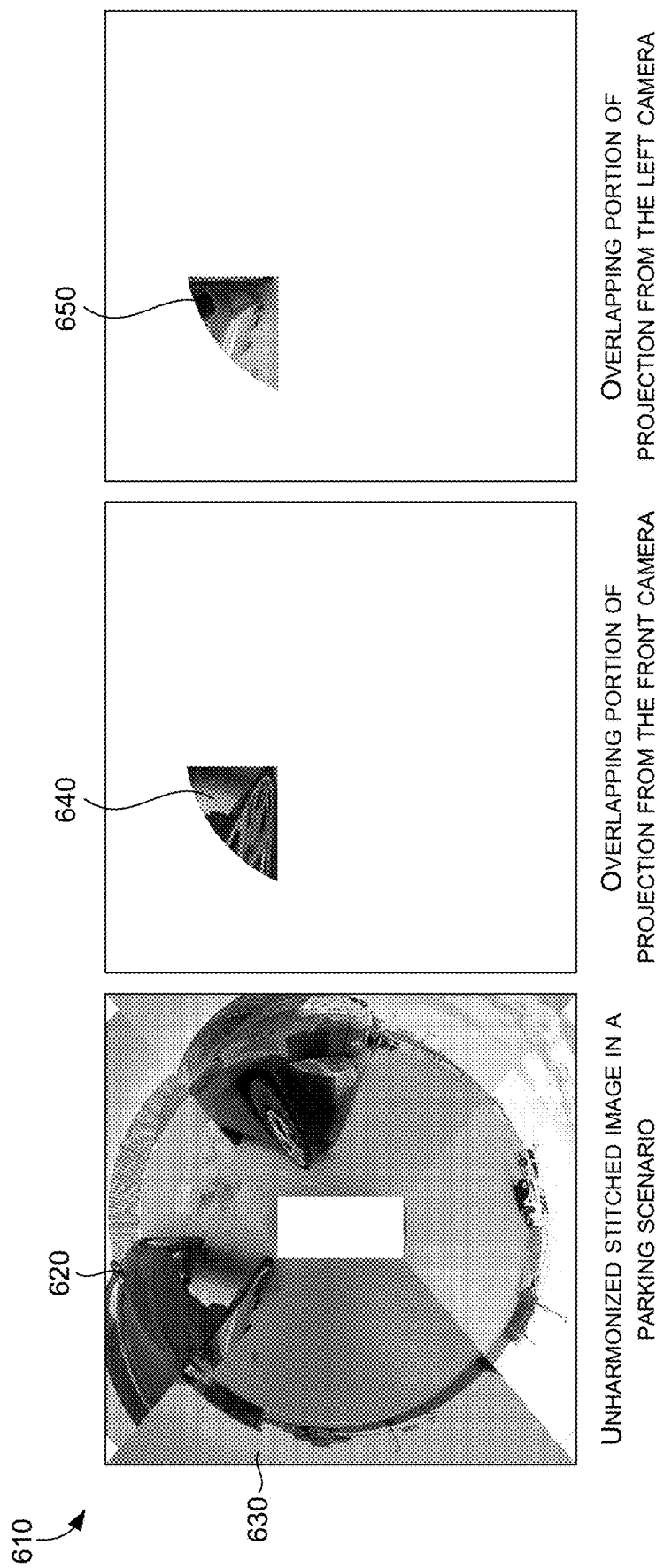
FIG. 6 illustrates an example overlapping region between two ground projections where the amount of pixels in an overlapping region that belong to detected objects exceeds a threshold, in accordance with some embodiments of the present disclosure.

By way of illustration, FIG. 6 illustrates an example overlapping region between two ground projections where the amount of pixels in the overlapping region that belong to detected objects exceeds a threshold, in accordance with some embodiments of the present disclosure. In FIG. 6, an unharmonized stitched image 610 includes a front frame 620 and a left frame 630. Projecting the front frame 620 and the left frame 630 onto the ground plane of a 3D bowl modeling the 3D environment and taking the portions of those projections that overlap yields ground projection 640 and ground projection 650, respectively. In this example, most of the pixels in both the ground projection 640 and the ground projection 650 represent an adjacent vehicle, so corresponding object masks may be projected and used to determine that the number of pixels in the overlapping region corresponding to the ground projection 640 and the ground projection 650 exceeds some threshold (e.g., more than 50% of the pixels). As a result, a determination may be made not to use either of the front frame 620 or the left frame 630 as a reference frame. In some cases (e.g., where frame identification module 135 of FIG. 1 is configured to select a reference frame corresponding to the direction of ego-motion, but a determination is made not to use that reference frame), the reference frame from the preceding time slice may be used to transfer color statistics to the target frame for the current time slice. By way of explanation, in some embodiments, during a relatively short duration such as that between successive time slices, it may be assumed that the surrounding environment is unlikely to change significantly, so it should be possible to rely on color statistics from the preceding time slice. Furthermore, using a reference frame from the preceding time slice in situations like this helps to maintain temporal stability of the color harmonization over successive sets of frames.

Returning to FIG. 3, if a determination is made at decision block B314 that the count or percentage of points (e.g., pixels) that are in the overlapping region and that belong to a detected object does not exceed a designated threshold (e.g., meaning there may be some object pixels and some ground pixels), the method 300 advances to block B318, which includes identifying common points (e.g., pixels) that are common to both overlapping ground projections of the reference and target frames and passing (e.g., a majority cluster of) the common pixels from each overlapping ground projection to block B312 to use to compute and transfer color statistics. For example, with respect to FIG. 1, the color harmonizer 130 may use a projected object and/or segmentation mask(s) to remove points (e.g., pixels) from a corresponding ground projection that belong to a detected object, cluster the remaining points (e.g., using k-means clustering), and identify a majority cluster of the remaining points. Since block B318 occurs after determining that there are at least some points that belong to a detect object, but there are less than a designated threshold (e.g., 50%), an assumption may be made that the majority cluster from each ground projection is formed by common pixels that belong to the ground. In another example, the color harmonizer 130 may compare the ground projections using some measure of image quality or similarity (e.g., by generating a structural similarity or "SSIM" quality map of SSIM values representing structural similarity for each pixel), may identify points (e.g., pixels) that have values of the measure of image quality or similarity that are above a designated threshold, and may use those points (or a majority cluster thereof) as the common pixels.

Figure 7A:
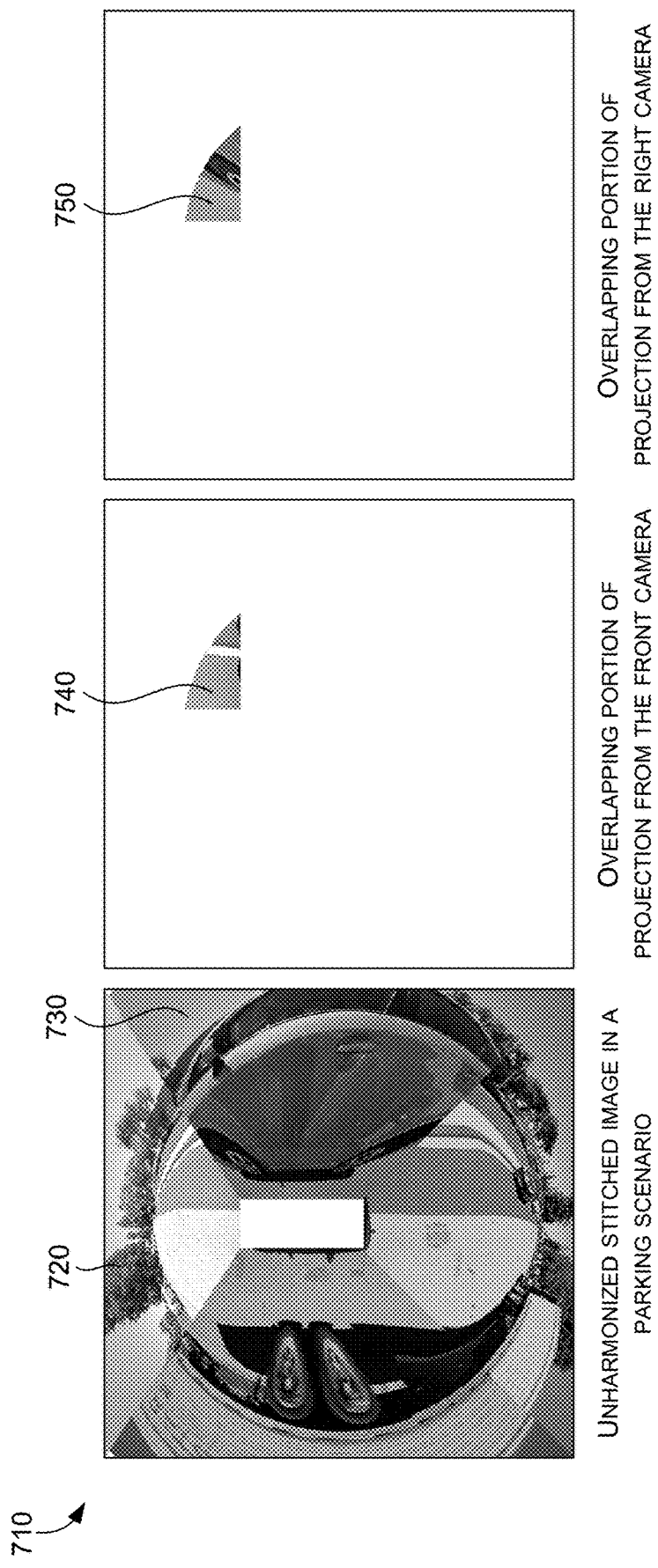
FIG. 7A illustrates an example overlapping region between two ground projections where the amount of pixels in an overlapping region that belong to detected objects is less than a threshold.
Figure 7B:
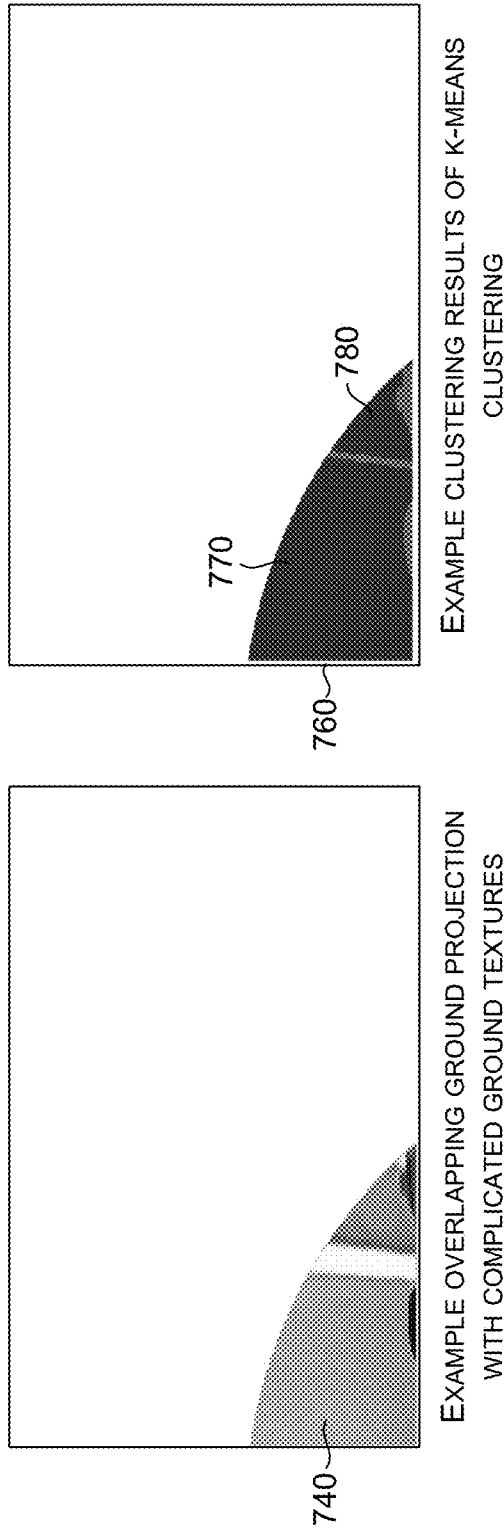
FIG. 7B illustrates an example ground projection with clustered pixels, in accordance with some embodiments of the present disclosure.

By way of illustration, FIG. 7A shows an example overlapping region between two ground projections where the amount of pixels that are in the overlapping region and that belong to detected objects is less than a threshold, in accordance with some embodiments of the present disclosure. In FIG. 7A, an unharmonized stitched image 710 includes a front frame 720 and a right frame 730. Projecting the front frame 720 and the left frame 730 onto the ground plane of a 3D bowl modeling the 3D environment and taking the portions of those projections that overlap yields ground projection 740 and ground projection 750, respectively. In this example, the overlapping region between the ground projection 740 and the ground projection 750 includes less than some threshold number or count of pixels that belong to a detected object. As a result, the pixels in each of the ground projection 740 and the ground projection 750 may be clustered (e.g., using k-means clustering). FIG. 7B illustrates an example ground projection with clustered pixels, in accordance with some embodiments of the present disclosure. In FIG. 7B, the ground projection 740 is shown on the left, and the clustering results 760 are shown on the right. In this example, the clustering results 760 include two clusters, a majority cluster 770 and a minority cluster 780.

As such, and returning to FIG. 3, the common pixels identified from each ground projection (e.g., a majority cluster from each ground projection) may be identified at block B318. The method 300 may then return to block B312, which includes transferring to the target frame color statistic(s) of the common pixels (e.g., the majority cluster) of the ground projection of the reference frame. For example, with respect to FIG. 1, the color harmonizer 130 may use the identified pixels from each ground projection to compute the relevant color statistics for the reference and target frames. As such, the color harmonizer 130 may compute color statistic(s) for the majority clusters of the ground projections of the reference and target frames, and use the color statistic(s) to modify the colors of the target frame to match the color statistic(s) of the majority cluster of the ground projection of the reference frame. The method 300 may be repeated to harmonize color among a set of frames representing a given time slice, and/or for successive set of frames representing successive time slices.

Figure 8:
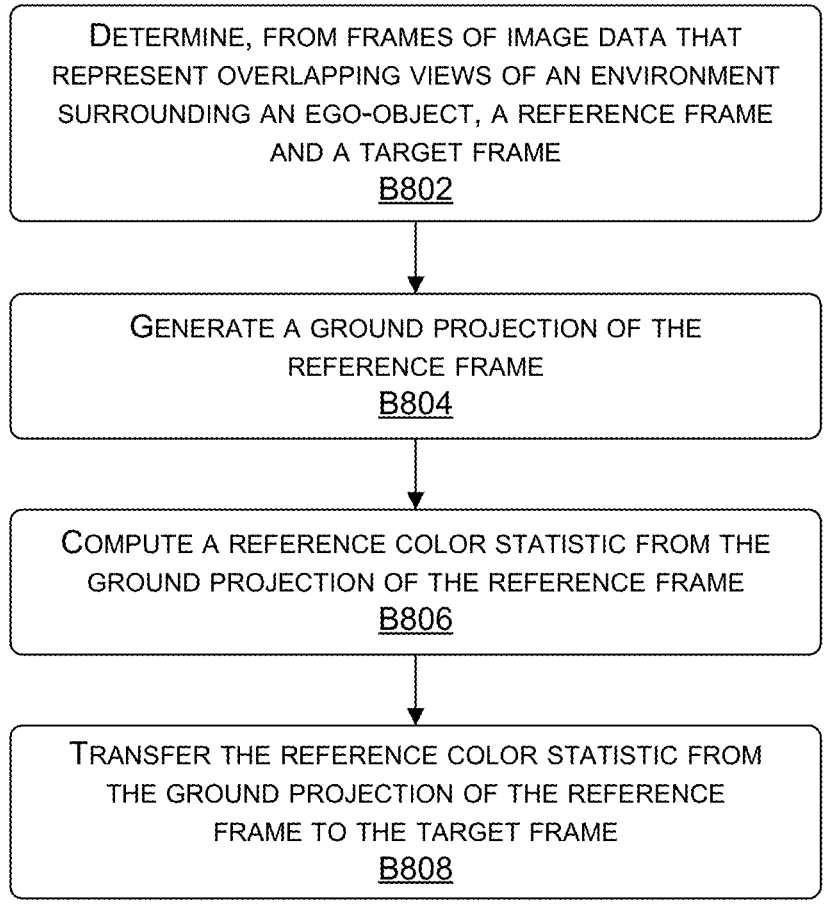
FIG. 8 is a flow diagram showing a method for color harmonization using a ground projection of a reference frame, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 800 may be implemented by the color harmonizer 130 of the example Surround View System 100 of FIG. 1. However, this method may additionally or alternatively be executed by any one system, or any combination of systems, including, but not limited to, those described herein.

FIG. 8 is a flow diagram showing a method 800 for color harmonization using a ground projection of a reference frame, in accordance with some embodiments of the present disclosure. The method 800, at block B802, includes determining, from frames of image data that represent overlapping views of an environment surrounding an ego-object, a reference frame and a target frame. For example, with respect to FIG. 1, the frame identification module 135 may be provided with successive sets of frames of image data representing a 3D environment in successive time slices, and the frame identification module 135 may identify, from the set of frames for each time slice, a reference frame (e.g., an image or portion of a stitched image from a particular camera) from which color statistics should be transferred, and a target frame (e.g., another image or another portion of a stitched image from a different camera) which should be modified so its color statistics match those of a ground projection of the reference frame (or portion thereof). A reference frame (e.g., an image) may be selected to correspond with the direction of ego-motion (e.g., use an image from a forward facing camera when moving forward), an active viewport (e.g., use an image from a camera pointing in the direction of an active viewport), operator gaze (e.g., use an image from a camera pointing in the direction of the gaze of an operator of the ego-object), and/or other ways. A frame with a view that overlaps the selected reference frame may be selected as a target frame.

The method 800, at block B804, includes generating a ground projection of the reference frame. For example, with respect to FIG. 1, the projection module 140 may project the reference and target frame onto corresponding portions of a ground plane of (e.g., a 3D bowl that models) the 3D environment represented by the reference and target frames, identify an overlapping region between these projections, and designate the portion of the projection of the reference frame that lands in the overlapping region as the ground projection of the reference frame.

The method 800, at block B806, includes computing a reference color statistic from the ground projection of the reference frame. For example, with respect to FIG. 1, the color harmonization module 145 may compute one or more reference color statistics (e.g., mean, standard deviation, per color channel mean, per color variance, correlation(s) between color channels) for the pixels in the ground projection of the reference frame (or a portion thereof, such as a majority cluster), and may compute one or more initial color statistics for the pixels in a ground projection of the target frame.

The method 800, at block B808, includes transferring the reference color statistic from the ground projection of the reference frame to the target frame. For example, with respect to FIG. 1, the color harmonization module 145 may transfer one or more reference color statistics from the ground projection of the reference frame to the target frame by modifying the colors of the target frame to match the reference color statistics (e.g., scaled by the ratio of a color statistic for the pixels from the ground projection of the reference frame to a color statistic for the pixels of the ground projection of the target frame).

Figure 9:
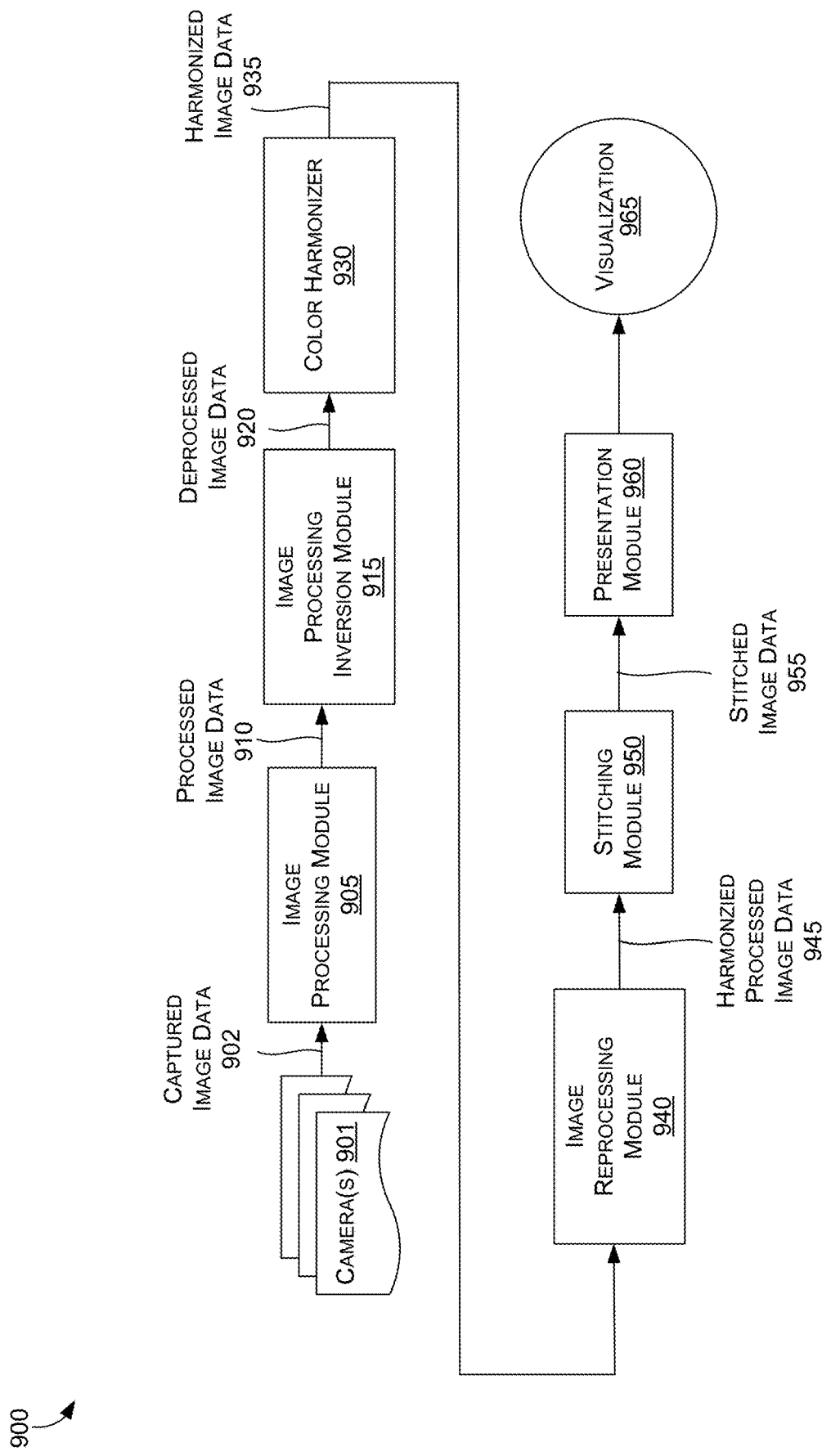
FIG. 9 is a diagram illustrating an example data flow through an example SVS that applies color harmonization to deprocessed image data, in accordance with some embodiments of the present disclosure.

Turning now to FIG. 9, FIG. 9 is a diagram illustrating an example data flow through an example Surround View System 900 that applies color harmonization to deprocessed image data, in accordance with some embodiments of the present disclosure. At a high level, the example Surround View System 900 generates a visualization 965 of a 3D environment (e.g., around an ego-object, such as a vehicle) based on frames of captured image data 902 of the environment. The frames of captured image data 902 may be captured by one or more cameras 901 of an ego-object or ego-actor (e.g., autonomous vehicle 1200 of FIGS. 12A-12D) as the ego-object or ego-actor navigates through the 3D environment. An image processing module 905 may process the frames of captured image data 902 using any number and type of known image processing techniques to generate frames of processed image data 910. An image processing inversion module 915 may generate deprocessed image data 920 by inverting one or more stages or types of image processing that were applied by the image processing module 905. The deprocessed image data 920 may be thought of as inverted image data in scenarios in which it includes values (e.g., pixel values) generated by inverting one or more stages or types of image processing. A color harmonizer 930 may harmonize color across frames of the deprocessed image data 920 to generate frames of harmonized image data 935. An image reprocessing module 940 may generate frames of harmonized processed image data 945 by reapplying the one or more stages or types of image processing that were inverted by the image processing inversion module 915. A stitching module 950 may stitch the frames of harmonized image data 945 into stitched image data 955 (e.g., a 360° surround view visualization, a panorama), and a presentation module 960 may cause presentation of a visualization 965 of a representation of at least a portion of the stitched image data 955 (e.g., on a monitor visible to an occupant or operator of the ego-object or ego-actor). In some embodiments, the presentation module 960 projects the stitched image data 955 onto a 3D representation of the 3D environment (e.g., a 3D bowl that models the 3D environment), renders a view of the projected image data from the perspective of a virtual camera, and causes presentation of the rendered view as the visualization 965.

An example camera 901 includes an image sensor (e.g., a complementary metal-oxide semiconductor or "CMOS" sensor) that captures pixel values in one or more color channels. The camera 901 may include or be associated with a capturing algorithm that determines one or more capture configuration parameters (e.g., sensor exposure time, analog-to-digital gain, an OETF or gamma curve, a tone mapping curve, AWB correction coefficients, a lens shading profile, etc.). Capture configuration parameters such as sensor exposure time and analog-to-digital gain may be used to control the image sensor and generate frames of captured image data 902, which may be in a linear light space, meaning the values captured by the image sensor are proportional to the illuminance in the captured scene.

The image processing module 905 may process the frames of captured image data 902 using any number and type of known image processing techniques and capture configuration parameters (e.g., an OETF or gamma curve, a tone mapping curve, AWB correction coefficients, a lens shading profile, etc.) to generate frames of processed image data 910. More specifically, since the color space of the image sensor may not correspond to the color space of a downstream display, for example, due to different color gamuts (e.g., sensors usually have wider color gamuts) or spectral responses, the image processing module 905 may apply color space correction (CSC), which may include a linear transform from a sensor color space to a display color space (e.g., using a 3×3 CSC matrix that transforms sensor RBG space to display RBG space, to use an example color space). The CSC may include a white balance correction (AWB) that attempts to remove unrealistic color casts based on an estimated temperature of the illuminants in the scene. Additionally or alternatively, the image processing module 905 may apply tone mapping by applying a nonlinear curve to brightness data (e.g., to boost up shadows and compress highlights which approximates how our eyes work), which may serve to map a high dynamic range representation to a compressed representation (e.g., to facilitate downstream processing). These are just a few examples, and other types of image processing may additionally or alternatively be applied.

Since each of the camera(s) 901 may have its own capturing algorithm that runs independently of those running for other camera(s) 901, frames of processed image data 910 may be generated for different camera(s) 901 using different capture configuration parameters. As a result, different frames of processed image data 910 may have been generated using different types of nonlinear transforms, and the frames of processed image data 910 may not be in the same light space, and may not be in a linear light space. However, by inverting image processing that was performed on each frame of processed image data 910, the frames may be transformed back into a common reference space of linear light (or a common reference space that approximates the illuminance of the scene better than the processed image data 920).

Accordingly, the image processing inversion module 915 may generate deprocessed image data 920 by inverting one or more stages or types of image processing that were applied by the image processing module 905 to corresponding frames of the captured image data 902. In order to invert any particular type or stage of image processing, the image processing inversion module 915 may access a corresponding capture configuration parameter that was applied to generate the processed image data 910, invert the capture configuration parameter, and apply the inverted capture configuration parameter to the processed image data 910 to generate the deprocessed image data 920. The image processing inversion module 915 may invert multiple stages or types of image processing in a reverse order than the one applied by the image processing module 905 (e.g., if tone mapping was applied at a last stage by the image processing module 905, the image processing inversion module 915 may apply inverse tone mapping first by applying the inverse of the tone mapping curve to the processed image data 910). Some stages of image processing applied by the image processing module 905 may be omitted from the inverse image processing applied by the image processing inversion module 915 (e.g., because it may not be possible or practical to invert some types of image processing, such as denoising or sharping). As such, the image processing applied by the image processing module 905 may be inverted using the corresponding capture configuration parameters for each frame to transform each frame of processed image data 920 from a nonlinear light space back into in a (substantially) linear light space, or otherwise transfer multiple frames of processed image data 920 into a common reference light space.

The color harmonizer 930 may harmonize color across frames of deprocessed image data 920 to generate frames of harmonized image data 935 using any of the techniques described here. For example, the color harmonizer 930 may correspond to the color harmonizer 130 and perform corresponding functionality to generate the frames of harmonized image data 935. Applying color harmonization across different frames in a common (reference) space or (substantially) linear light space tends to improve the results of color harmonization over applying it across different frames in different or nonlinear light spaces, since common and linear light spaces are more conducive to transferring color statistics from frame to frame.

The image reprocessing module 940 may reapply the one or more stages of image processing that were inverted by the image processing inversion module 915 to generate frames of harmonized processed image data 945. In FIG. 9, the image reprocessing module 940 is illustrated as a separate component than the image processing module 905, but this need not be the case, as the image reprocessing module 940 may include, correspond to, or leverage some or all of the image processing module 905. In some embodiments, a particular frame of harmonized processed image data 945 may be processed using the same capture configuration parameter (e.g., a particular tone mapping curve) used by the image processing module 905 and inverted by the image processing inversion module 915. In some embodiments, the image reprocessing module 940 may reapply a particular stage or type of image processing by determining and applying a combined capture configuration parameter that averages, approximates, or otherwise combines the capture configuration parameters used to generate different frames in a set of frames representing a common time slice. For example, assume four different tone mapping curves were applied (and inverted) for four different frames of captured image data 902. To reapply tone mapping, the four different tone mapping curves may be averaged, and the resulting average tone mapping curve may be applied to each corresponding frame of harmonized processed image data 945. As such, the image reprocessing module 940 may generate frames of harmonized processed image data 945 by reapplying the one or more stages of image processing that were applied by the image processing module 905 (e.g., in the same order as the image processing module 905). Although FIG. 9 illustrates an example implementation in which the color harmonizer 930 is applied before the image reprocessing module 940, in some embodiments, the color harmonizer 930 may be applied after the image reprocessing module 940. As such, and the frames of harmonized processed image data 945 may be stitched together by the stitching module 950 and a representation thereof may be presented by the presentation module 960.

Figure 10:
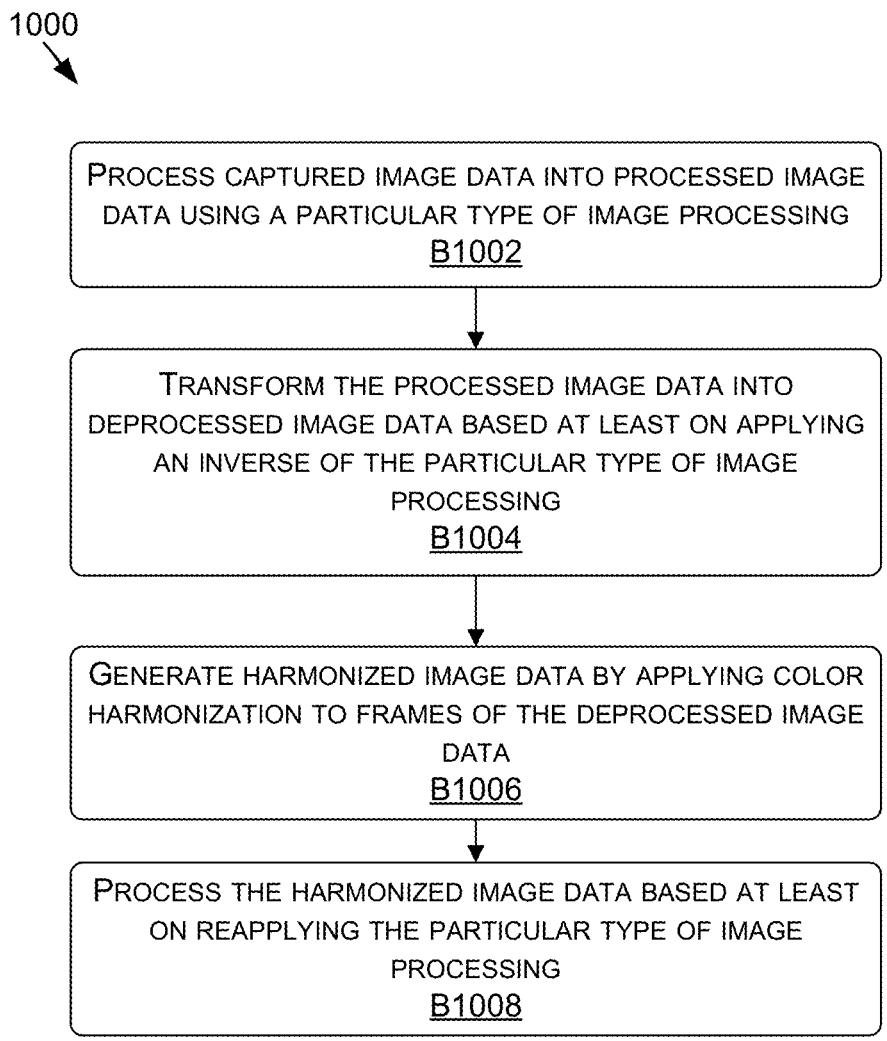
FIG. 10 is a flow diagram showing a method for applying color harmonization to deprocessed image data, in accordance with some embodiments of the present disclosure.

Now referring to FIG. 10, each block of method 1000, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 1000 may be implemented by the example Surround View System 900 of FIG. 9. However, this method may additionally or alternatively be executed by any one system, or any combination of systems, including, but not limited to, those described herein.

FIG. 10 is a flow diagram showing a method 1000 for applying color harmonization to deprocessed image data, in accordance with some embodiments of the present disclosure. The method 1000, at block B1002, includes processing captured image data into processed image data using a particular type of image processing. For example, with respect to FIG. 9, the image processing module 905 may process frames of captured image data 902 using any number and type of known image processing techniques to generate frames of processed image data 910. Example image processing may include gamma correction to improve color range, exposure compensation, tone mapping, noise reduction, removing bad pixels, applying white balance, applying color correction to remove lens shading artifacts in fisheye images, and/or others.

The method 1000, at block B1004, includes transforming the processed image data into deprocessed image data based at least on applying an inverse of the particular type of image processing. For example, with respect to FIG. 9, the image processing inversion module 915 may generate frames of deprocessed image data 920 by inverting one or more stages of image processing (e.g., gamma correction to improve color range, exposure compensation, tone mapping, AWB, CSC) that were applied on corresponding frames of captured image data 902 by the image processing module 905. In order to invert any particular type or stage of image processing, the image processing inversion module 915 may access a corresponding capture configuration parameter that was used to generate the processed image data 910 (e.g., an OETF or gamma curve, a tone mapping curve, AWB correction coefficients, a CSC matrix, a lens shading profile), and the image processing inversion module 915 may invert the capture configuration parameter and apply the inverted capture configuration parameter to the processed image data 910 to generate the deprocessed image data 920.

The method 1000, at block B1006, includes generating harmonized image data by applying color harmonization to frames of the deprocessed image data. For example, the color harmonizer 930 of FIG. 9 or the color harmonizer 130 of FIG. 1 may harmonize color across frames of deprocessed image data 920 to generate frames of harmonized image data 935. More specifically, the color harmonizer 930 may include a frame identification module (e.g., corresponding to the frame identification module 135 of FIG. 1) that identifies or accepts an identification of a reference frame and a target frame of deprocessed image data 920, a projection module (e.g., corresponding to the projection module 140 of FIG. 1) that generates ground projections of the reference and target frames, and a color harmonization module (e.g., corresponding to the color harmonization module 145 of FIG. 1) that computes and transfers one or more reference color statistics (e.g., any statistical moment or property of one or more color channels) from the ground projection of the reference frame to the target frame.

The method 1000, at block B1008, includes processing the harmonized image data based at least on reapplying the particular type of image processing. For example, with respect to FIG. 9, the image reprocessing module 940 may generate frames of harmonized processed image data 945 by reapplying the one or more stages or types of image processing that were inverted by the image processing inversion module 915. In some embodiments, the image reprocessing module 940 may reapply a particular stage or type of image processing by determining and applying a combined capture configuration parameter that averages, approximates, or otherwise combines the capture configuration parameters used to generate different frames in a set of frames representing a common time slice (e.g., an average tone mapping curve that averages different tone mapping curves originally applied to different frames of captured image data 902 by the image processing module 905).

Example Image Stitching Techniques

Figure 11A:
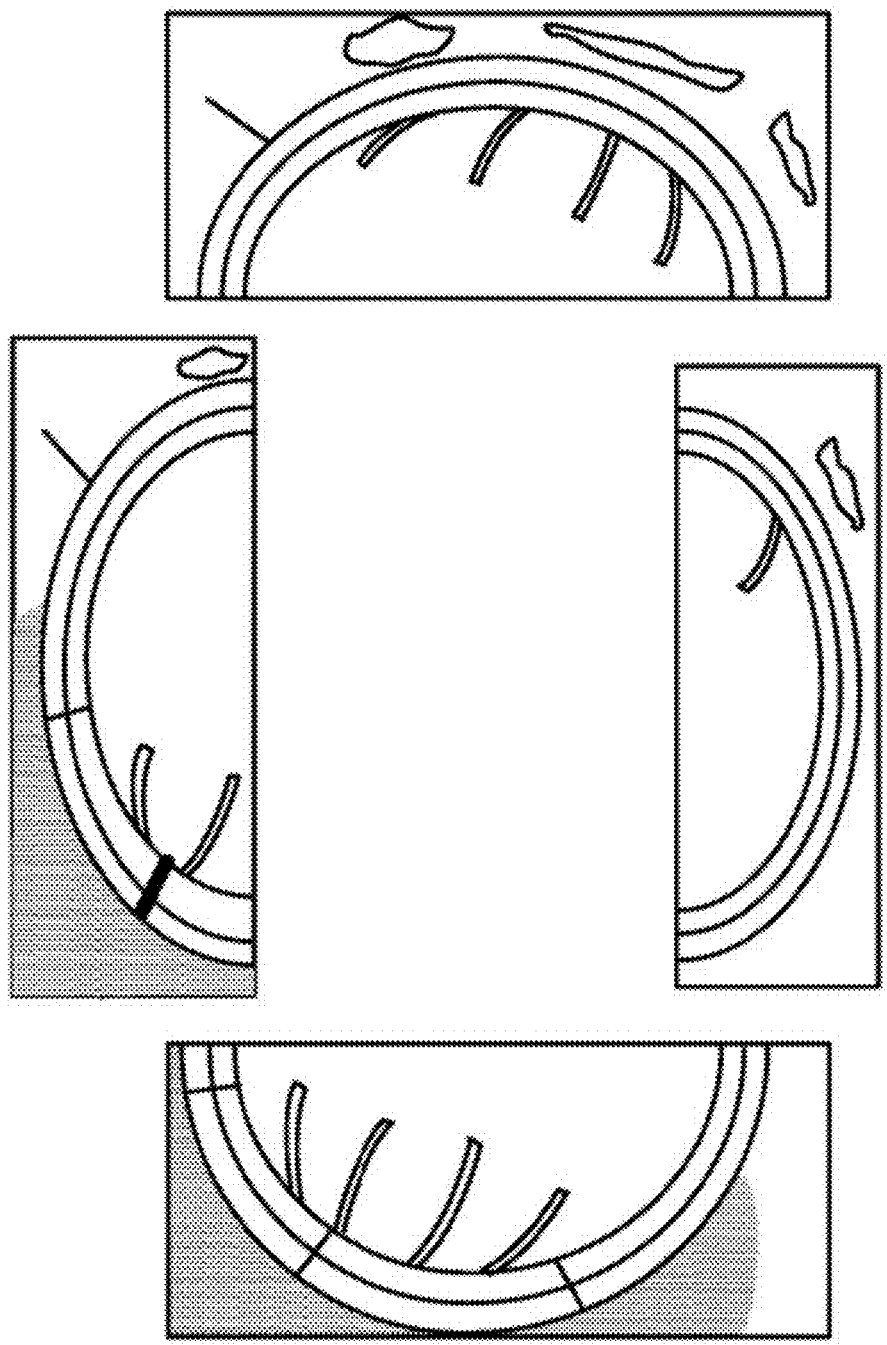
FIGS. 11A and 11B illustrate an example of image stitching.
Figure 11B:
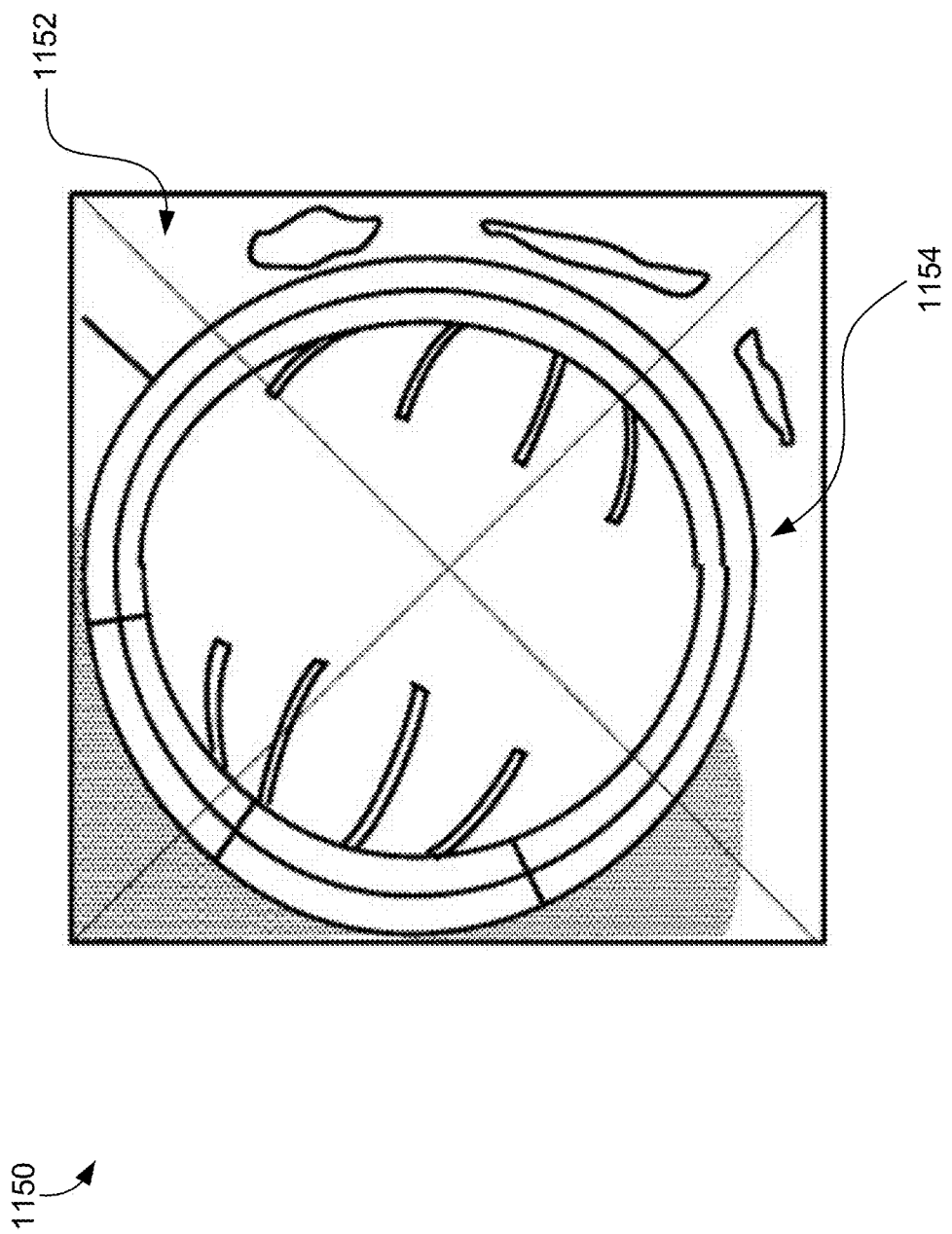

FIGS. 11A-11B illustrate an example of image stitching, in accordance with some embodiments of the present disclosure. FIG. 11A illustrates a set of four constituent images 1130 that can be captured by respective cameras on, or associated with, an autonomous vehicle (e.g., the example autonomous vehicle 1200 of FIGS. 12A-12D) or other system or device in accordance with various embodiments. In this example, the cameras have different but partially overlapping fields of view, such that the images may be stitched together without gap filling or additional image data generation, although it should be understood that there may be other situations where cameras do not produce images with at least partially overlapping views that may require such tasks. In this example, each camera may have various intrinsic or extrinsic values that can impact the appearance of a captured image, where those values may relate to field of view, optical center, focal length, or camera pose, among other such options.

As mentioned, it may be desirable to generate a single, consistent view of this surrounding environment based at least in part upon these captured images 1130. This may include, for example, generating a composite image 1150 as illustrated in FIG. 11B. As illustrated, such a composite image may provide a single, consistent representation of the environment, whether a full 360° view or at least a portion of the angular range. Such a view may be presented as a single view showing the entire image 1150, or portions of the image may be displayed at different times, where that view may be controllable by a user. In this example, an angular shape alpha map may be used instead of, for example, a perpendicular shape alpha map, at least to avoid the alpha discontinuity issue observed in various traditional stitching techniques. Blending region color continuity may be improved by extending the blending region(s) to hide a color discontinuity issue around corners or other such features.

Figure 11C:
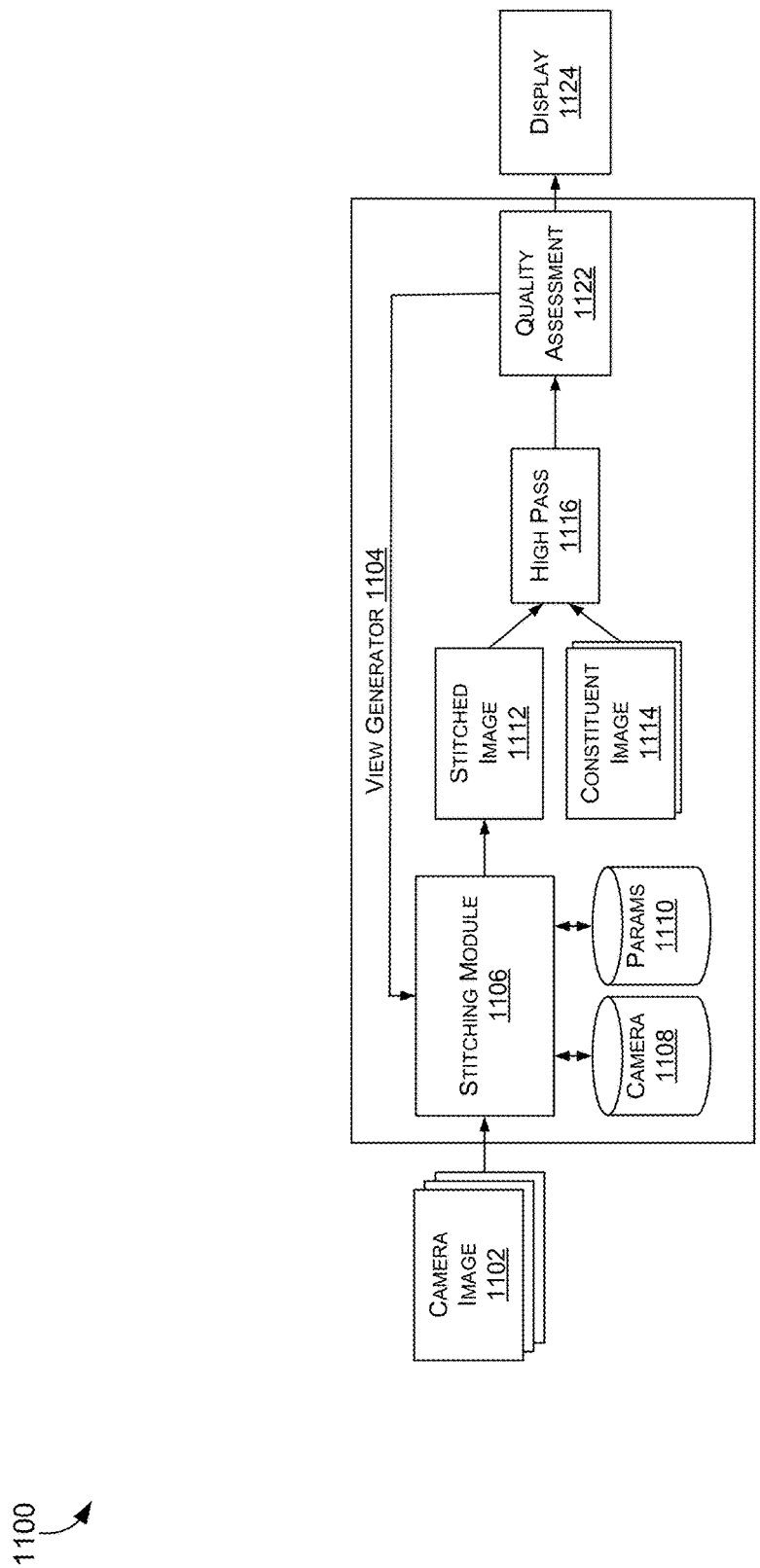
FIG. 11C is a diagram illustrating an example data flow through an example image stitching system, in accordance with some embodiments of the present disclosure.

FIG. 11C is a diagram illustrating an example data flow through an example image stitching system 1100, in accordance with some embodiments of the present disclosure. In this example, a set of camera images 1102 may be received as input, and may be received from multiple cameras associated with a given device or system (e.g., the example autonomous vehicle 1200 of FIGS. 12A-12D), or positioned with respect to a given environment, among other such options. In at least one embodiment, these images represent two or more different views of an environment that are, at most, partially overlapping. These images may represent a full, or partial, view of a scene, location, or environment. This image data may include "live" data that is streamed or transmitted shortly after image capture, or may include image data captured previously and provided in a more offline fashion.

In this example, the camera images may be provided to a view generator 1104 that may use these input camera images 1102 to generate an output view or composite image, or video stream, for presentation via at least one display 1124, such as a monitor, projector, or wearable display, among other such options. In this example, the camera images 1102 may be provided to a stitching module 1106 that will attempt to stitch multiple images together to generate a composite representation. The stitching module may use any of a number of different stitching or compositing algorithms, as may perform various blending or other image manipulation techniques. In at least one embodiment, the stitching module may use various intrinsic and extrinsic parameters of the cameras, at least to the extent values for these parameters are known and available from a camera database 1108 or other such location, in order to properly assign the image data for compositing. This may include, for example, information such as the relative poses or orientation of these different cameras, such that at least an initial stitching position and orientation may be determined for each image. It should be understood that for view generator systems that receive sequences of images or streams of video frame data, the images or frames to be composited may be those that correspond to, or were captured at, the substantially same point in time, at least to an extent to which such capture can be synchronized, or otherwise represent the same time slice.

The camera calibration parameters may be used to map the camera views into a stitched space, such as may correspond to a top-down view or "bowl" view in a projection space. This projection may be used to identify any overlapping regions between adjacent cameras, where one or more blending algorithms may be used to blend at least some of the pixels to make the stitching less visible or apparent. The stitching module 1106 may use values for one or more stitching parameters, as may be stored to a parameter database 1110 or other such location. Values for these parameters may determine aspects of how component images are stitched together, as may relate to weightings or locations for blending and other such aspects. Example stitching parameters include, but are not limited to, blending method (e.g., alpha blending or multiband blending), blending width, blending alpha map shape (e.g., angular based or perpendicular based), seam type (e.g., diagonal seam, vertical seam, or horizontal seam), and seam location. The stitching module 1106 may use values for these various parameters with the input constituent images to generate a composite image, or stitched image 1112, that provides a single representation of an environment, scene, or location at a point in time, such as a "current" point in time, accounting for some amount of latency in transmission and processing.

If a scene is not harmonized between cameras, it may be desirable to use a larger blending weight or radius (e.g., 200) to provide for a smoother transition between data from images. If it is a highly structured scene with lots of buildings and edges, for example, it may be desirable to use a smaller blending weight (e.g., 2) to avoid ghosting and other artifacts due to misalignment between cameras. Single band blending may be used where images are blended in only one band (or a subset) of multiple bands. In at least one embodiment, constituent images are decomposed into different frequency bands or components, and different blending weights may be used for each of these bands or components.

In order to attempt to provide stitched images of high subjective quality, some amount of processing of a stitched image may be performed to attempt to assess the quality, as well as to use a result of that assessment to make any changes to the stitching parameters that may be desirable to improve the quality, at least where the determined quality is below a target or threshold value or determination. In this example, both the stitched image 1112 from the stitching module 1106 and the constituent images 1114, used to generate that stitched image, may be used for a quality assessment determination. In some embodiments the constituent images may correspond directly to the input camera images 1102, while in some embodiments these constituent images may have had at least some amount of processing performed, such as to reduce variations in brightness, color, or contrast, or to reduce a presence of noise or remove image artifacts, among other such options. In at least one embodiment, removing or reducing a presence of image artifacts in the individual constituent images before stitching may result in a higher quality stitched image.

In this example, the stitched image 1112 and constituent images 1114 may be processed to produce image data that better provides for one or more specific types of comparison. In at least one embodiment, this may include utilizing a high pass filter 1116 (or edge or feature detector) on the images to enhance or identify edges or other prominent features in the images. In some embodiments, a quality assessment 1122 may be performed using any known technique, and if a measure of the quality assessment is below some designated threshold, the image data may be optimized in a loop, for example, by applying one or more geometric or photometric transforms and feeding the transformed image data back to the stitching module 1106.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 12A:
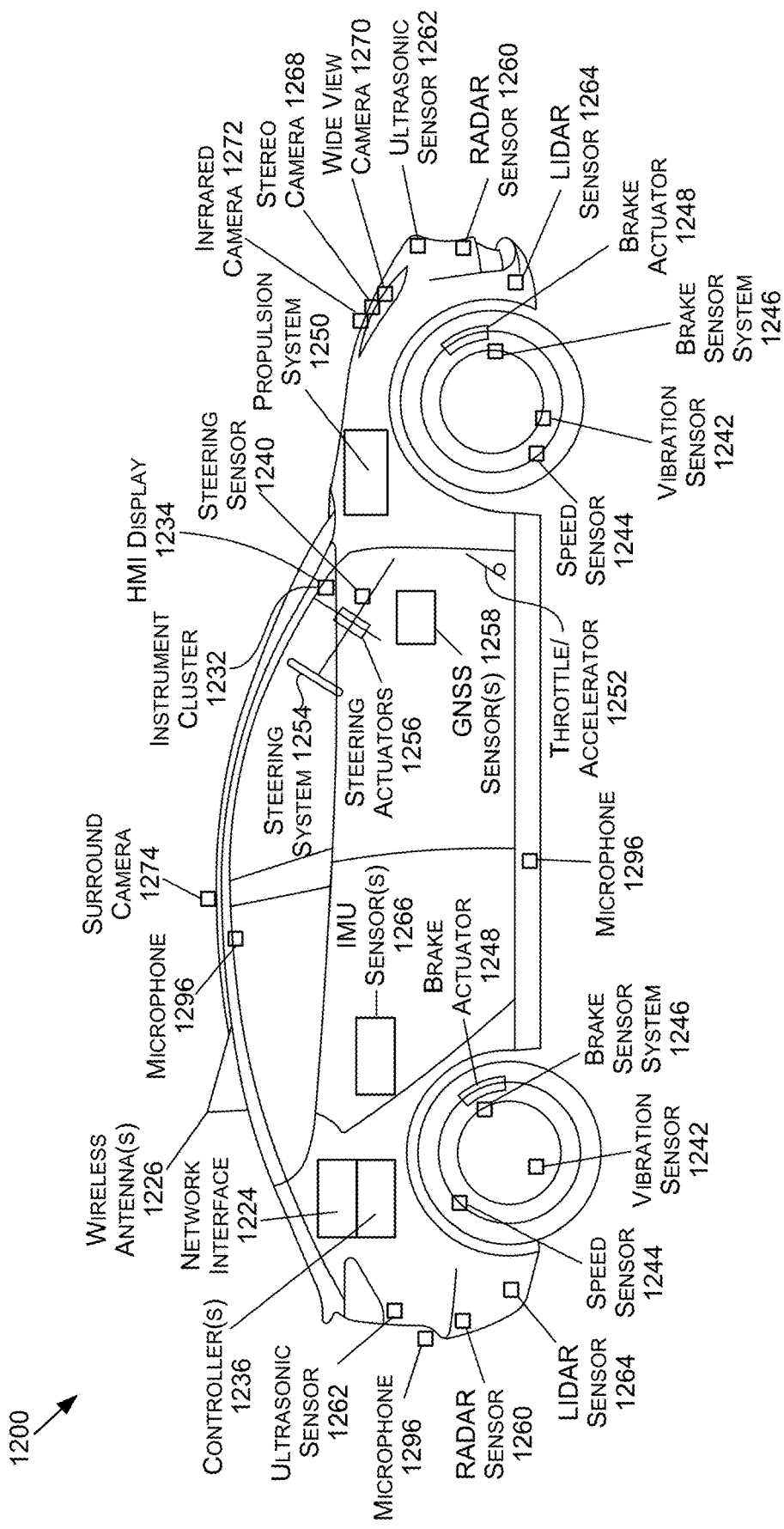
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3—Level 5 of the autonomous driving levels. The vehicle 1200 may be capable of functionality in accordance with one or more of Level 1—Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360° cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 12B:
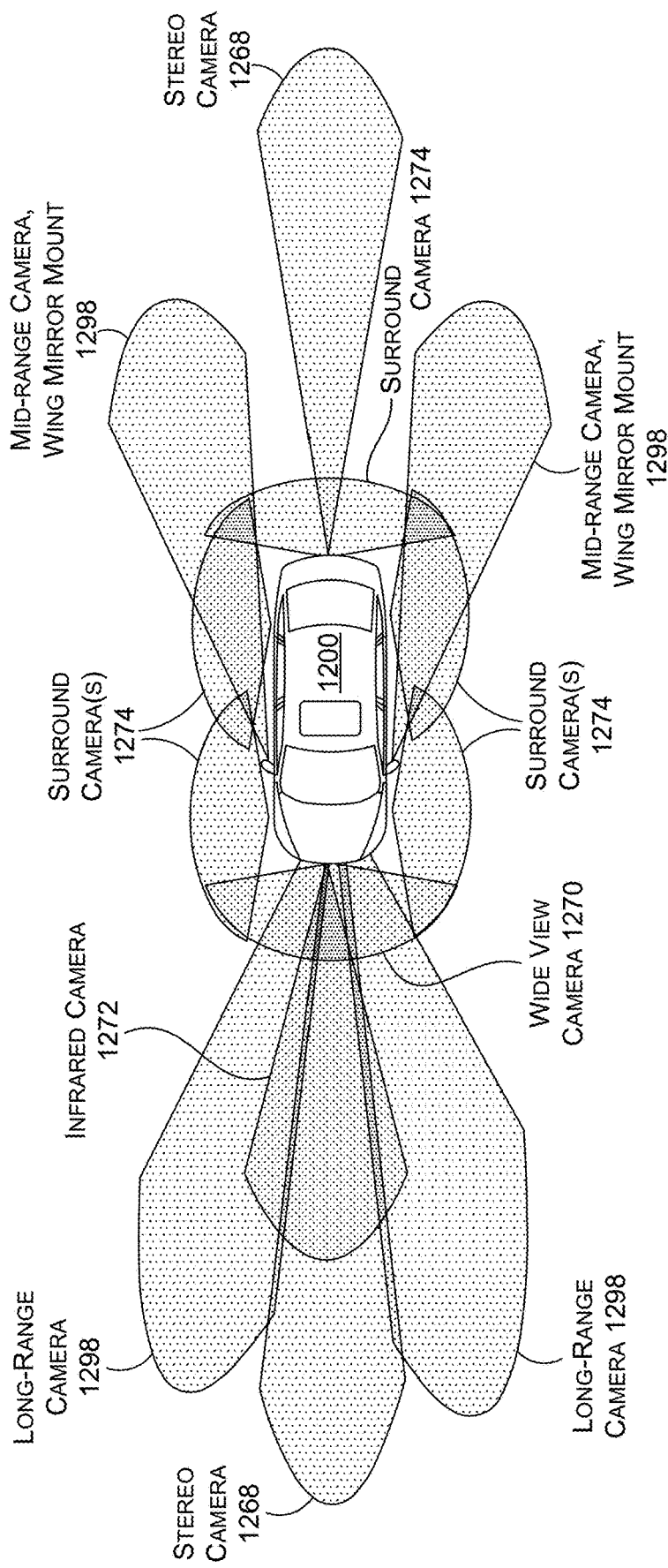
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semi-conductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360° camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Figure 12C:
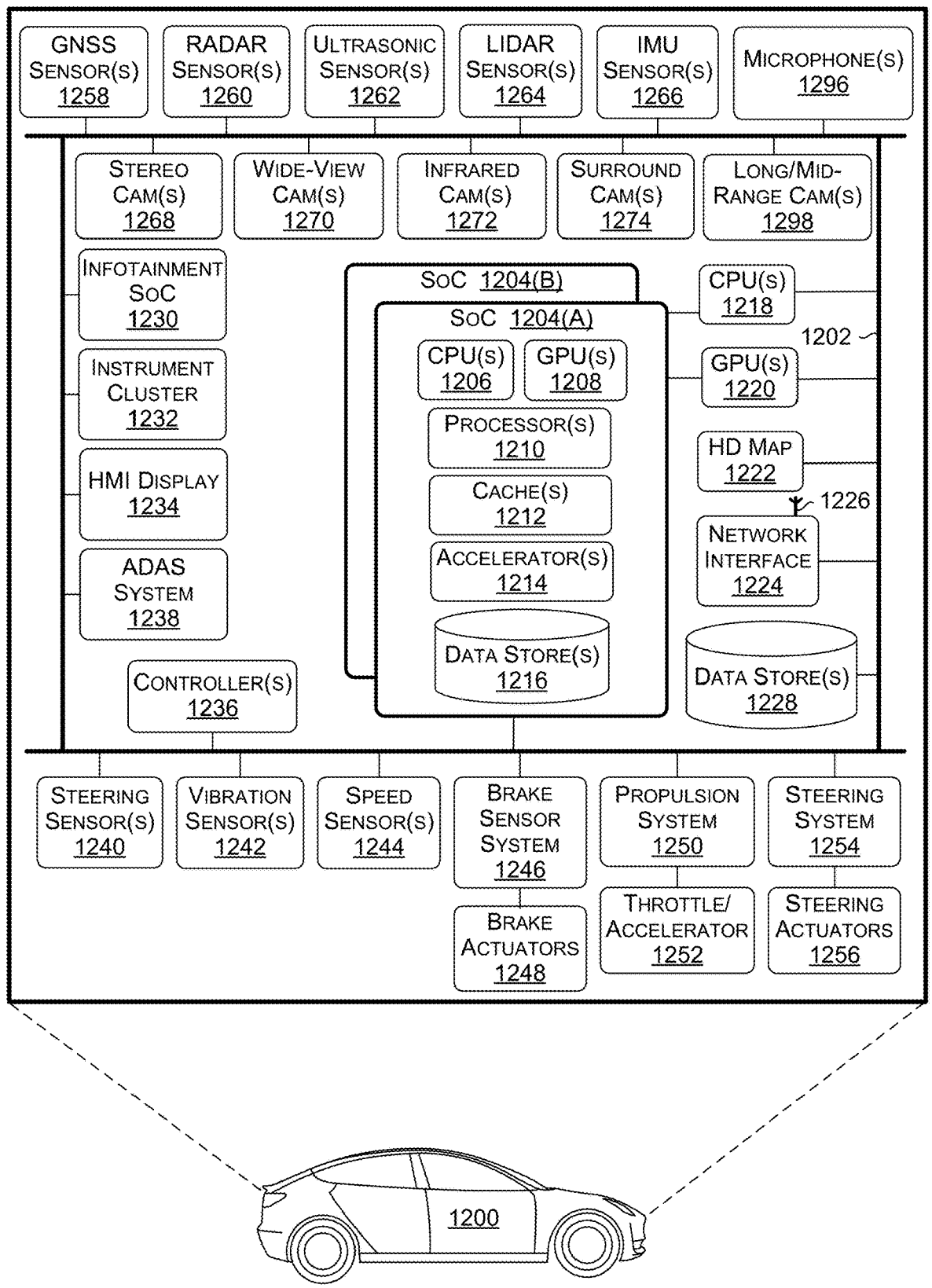
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system.

For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360° field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
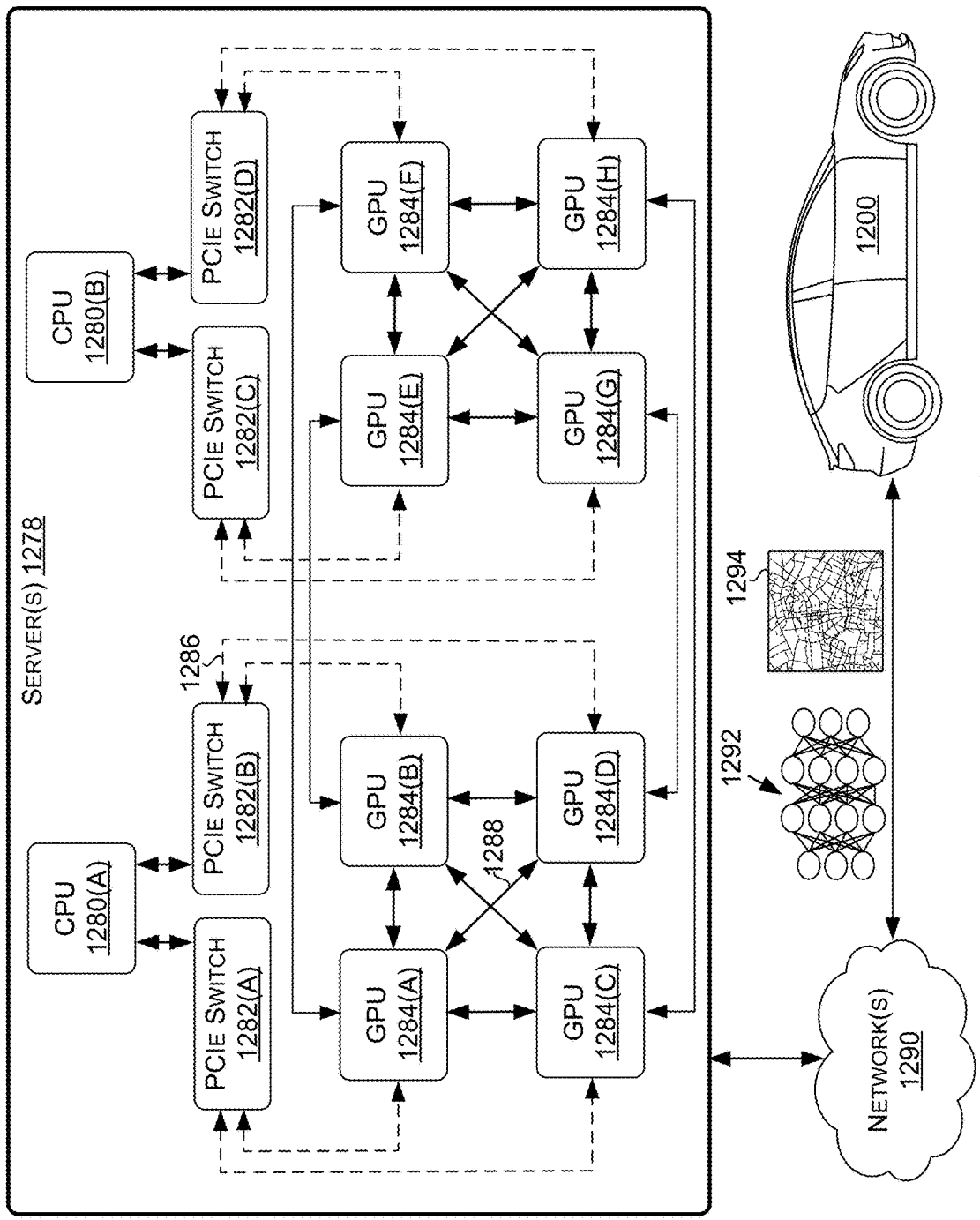
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
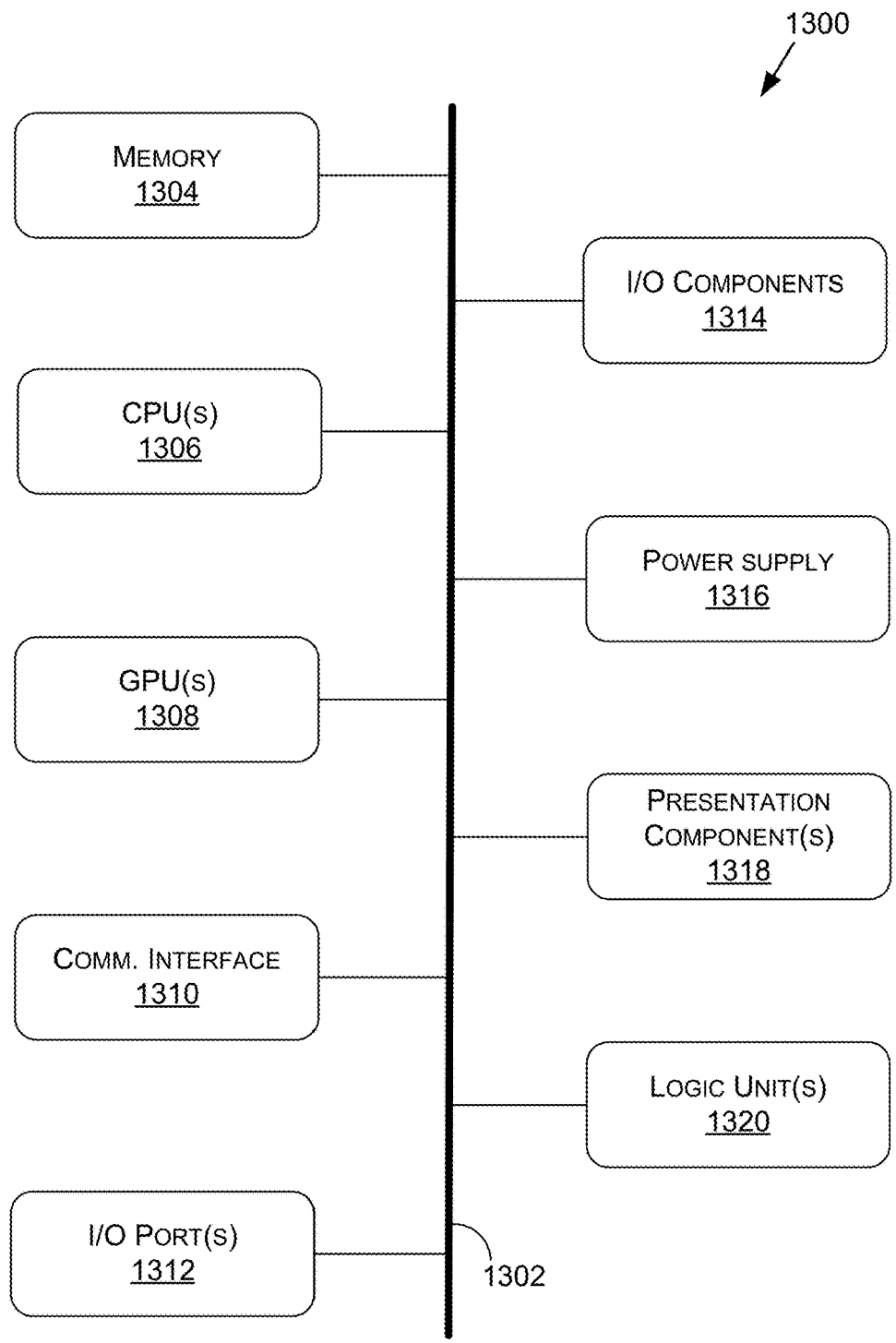
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
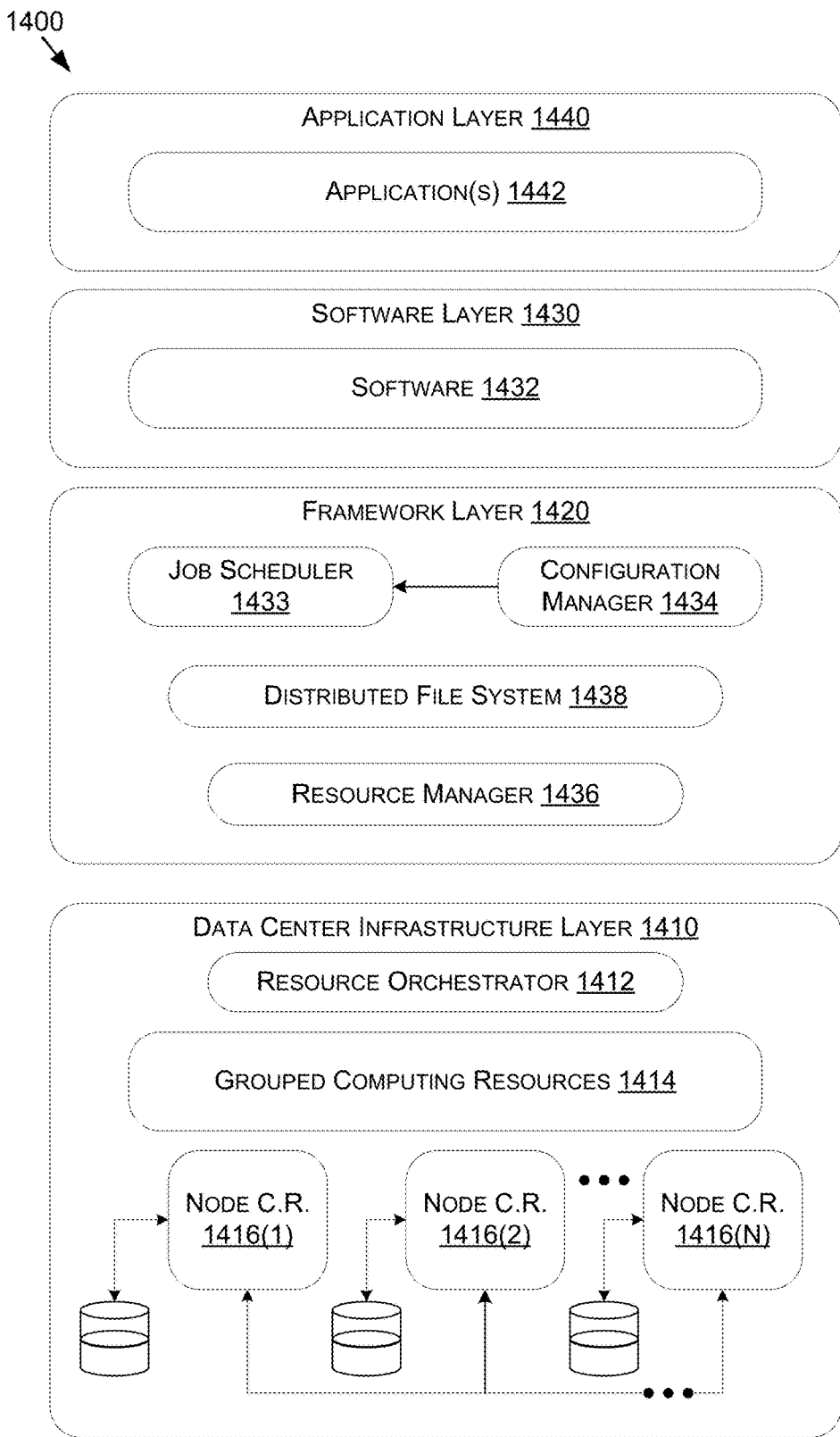
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may use distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/ or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underused and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using frames of image data that represent overlapping views of an environment surrounding an ego-object, a reference frame and a target frame;
   generating a ground projection of the reference frame;
   computing a reference color statistic using the ground projection of the reference frame; and
   based at least on a determination of whether an overlapping region associated with the reference frame and the target frame has a threshold amount of pixels that correspond to a detected object, transferring the reference color statistic from the ground projection of the reference frame to the target frame.

2. The method of claim 1, wherein the determining of the reference frame comprises selecting one of the frames of image data based at least on one or more of: a direction of ego-motion of the ego-object, an active viewport into the environment, or a gaze of an operator of the ego-object.

3. The method of claim 1, wherein the generating of the ground projection of the reference frame comprises projecting the reference frame onto a three-dimensional (3D) bowl to generate a projected 3D bowl representation, and using a portion of the projected 3D bowl representation corresponding to a ground plane of the environment as the ground projection of the reference frame.

4. The method of claim 1, wherein the reference and target frames represent different views of the environment in a same time slice, and the transferring the reference color statistic from the ground projection of the reference frame to the target frame is based at least on a determination that the overlapping region between the ground projection of the reference frame and a second ground projection of the target frame has less than or equal to a threshold number of pixels that belong to the detected object.

5. The method of claim 1, wherein the reference frame represents at least a portion of the environment from a preceding time slice and the target frame represents at least a portion of the environment from a subsequent time slice, and the transferring the reference color statistic comprises transferring the reference color statistic from the ground projection of the reference frame based at least on a determination that the overlapping region between a second ground projection of a candidate reference frame from the subsequent time slice and a third ground projection of the target frame includes more than a threshold number or percentage of pixels that correspond to the detected object.

6. The method of claim 1, wherein the computing of the reference color statistic from the ground projection of the reference frame comprises computing the reference color statistic from a majority cluster of the ground projection of the reference frame, and the transferring the reference color statistic comprises transferring the reference color statistic from the majority cluster of the ground projection of the reference frame to the target frame based at least on a determination that the overlapping region between the ground projection of the reference frame and a second ground projection of the target frame includes less than a threshold number or percentage of pixels that belong to the detected object.

7. The method of claim 1, wherein the transferring of the reference color statistic from the ground projection of the reference frame to the target frame generates a modified target frame, and the method further comprises stitching at least the reference frame and the modified target frame into a stitched image and causing presentation of a visualization based at least on the stitched image.

8. The method of claim 1, wherein the method is performed by at least one of:
   a control system for an autonomous or semi-autonomous machine;
   a perception system for an autonomous or semi-autonomous machine;
   a system for performing simulation operations;
   a system for performing real-time streaming;
   a system for presenting one or more of augmented reality content, virtual reality content,
   or mixed reality content;
   a system for performing digital twin operations;
   a system for performing deep learning operations;
   a system implemented using an edge device;
   a system implemented using a robot;
   a system incorporating one or more virtual machines (VMs);
   a system implemented at least partially in a data center;
   a system for performing light transport simulation;
   a system for performing collaborative content creation for 3D assets;
   a system for generating synthetic data; or
   a system implemented at least partially using cloud computing resources.

9. A processor comprising:
   one or more processing units to:
   determine a reference frame and a target frame; and
   based at least on a determination of whether an overlapping region associated with the reference frame and the target frame has a threshold amount of pixels that correspond to a detected object, use a first ground projection of the reference frame and a second ground projection of the target frame to transfer a reference color statistic from the first ground projection of the reference frame to the target frame.

10. The processor of claim 9, wherein the reference and target frames are generated using cameras disposed on an ego-object in an environment, and the one or more processing units are further to determine the reference frame based at least on one or more of: a direction of ego-motion of the ego-object, an active viewport into the environment, or a gaze of an operator of the ego-object.

11. The processor of claim 9, wherein the one or more processing units are further to generate the first ground projection of the reference frame based at least on projecting the reference frame onto a three-dimensional (3D) bowl to generate a projected 3D bowl representation and using a portion of the projected 3D bowl representation corresponding to a ground plane as the first ground projection of the reference frame.

12. The processor of claim 9, wherein the reference and target frames represent different views of an environment in a same time slice, and the one or more processing units are further to transfer the reference color statistic from the first ground projection of the reference frame to the target frame based at least on a determination that the overlapping region between the first ground projection of the reference frame and the second ground projection of the target frame does not include any detected objects.

13. The processor of claim 9, wherein the reference frame represents a preceding time slice and the target frame represents a subsequent time slice, and the one or more processing units are further to transfer the reference color statistic from the reference frame from the preceding time slice based on a determination that the overlapping region between a third ground projection of a candidate reference frame from the subsequent time slice and the second ground projection of the target frame includes more than a threshold number or percentage of pixels that belong to the detected object.

14. The processor of claim 9, the one or more processing units are further to determine to transfer the reference color statistic from a majority cluster of the reference frame to the target frame based on a determination that the overlapping region between the first ground projection of the reference frame and the second ground projection of the target frame includes less than a threshold number or percentage of pixels that belong to the detected object.

15. The processor of claim 9, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing deep learning operations;
- a system for performing real-time streaming;
- a system for presenting one or more of augmented reality content, virtual reality content, or mixed reality content;
- a system implemented using an edge device;
- a system implemented using a robot;
- a system incorporating one or more virtual machines (VMs);
- a system implemented at least partially in a data center;
- a system for performing light transport simulation;
- a system for performing collaborative content creation for 3D assets;
- a system for generating synthetic data; or
- a system implemented at least partially using cloud computing resources.

16. A system comprising:
one or more processing units to:
- identify a reference image and a target image of an environment;
- generate a ground projection of the reference image;
- compute a reference color statistic from the ground projection of the reference image; and
- based at least on a determination of whether an overlapping region associated with the reference image and the target image has a threshold amount of pixels that correspond to a detected object, modify one or more colors of the target image to correspond to the reference color statistic from the ground projection of the reference image.

17. The system of claim 16, wherein the reference and target images represent different views of the environment in a same time slice, and the one or more processing units are further to modify the colors of the target image to correspond to the reference color statistic from the ground projection of the reference image based on a determination that the overlapping region between the ground projection of the reference image and a second ground projection of the target image has less than or equal to a threshold number of pixels that belong to the detected object.

18. The system of claim 16, wherein the reference image represents the environment from a preceding time slice and the target image represents the environment from a subsequent time slice, and the one or more processing units are further to modify the colors of the target image to correspond to the reference color statistic from the ground projection of the reference image from the preceding time slice based on a determination that the overlapping region between a second ground projection of a candidate reference image from the subsequent time slice and a third ground projection of the target image includes more than a threshold number or percentage of pixels that belong to the detected object.

19. The system of claim 16, wherein the computing of the reference color statistic from the ground projection of the reference image comprises computing the reference color statistic from a majority cluster of the ground projection of the reference image, and the one or more processing units are further to modify the colors of the target image to correspond to the reference color statistic from the majority cluster of the ground projection of the reference image based on a determination that the overlapping region between the ground projection of the reference image and a second ground projection of the target image includes less than a threshold number or percentage of pixels that belong to the detected object.

20. The system of claim 16, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing deep learning operations;
- a system for performing real-time streaming;
- a system for presenting one or more of augmented reality content, virtual reality content, or mixed reality content;
- a system implemented using an edge device;
- a system implemented using a robot;
- a system incorporating one or more virtual machines (VMs);
- a system implemented at least partially in a data center;
- a system for performing light transport simulation;
- a system for performing collaborative content creation for 3D assets;
- a system for generating synthetic data; or
- a system implemented at least partially using cloud computing resources.

* * * * *